(12) United States Patent
Kuder

(10) Patent No.: US 12,418,246 B2
(45) Date of Patent: Sep. 16, 2025

(54) MULTILEVEL CONVERTER FOR VOLTAGE CONVERSION BETWEEN A THREE-PHASE AC VOLTAGE AND A DC VOLTAGE

(71) Applicant: Universitaet der Bundeswehr Muenchen, Neubiberg (DE)

(72) Inventor: Manuel Kuder, Munich (DE)

(73) Assignee: Universitaet der Bundeswehr Muenchen, Neubiberg (DE)

( * ) Notice: Subject to any disclaimer, the term of this patent is extended or adjusted under 35 U.S.C. 154(b) by 777 days.

(21) Appl. No.: 17/778,103

(22) PCT Filed: Nov. 20, 2020

(86) PCT No.: PCT/EP2020/082834
§ 371 (c)(1),
(2) Date: May 19, 2022

(87) PCT Pub. No.: WO2021/105016
PCT Pub. Date: Jun. 3, 2021

(65) Prior Publication Data
US 2022/0360194 A1    Nov. 10, 2022

(30) Foreign Application Priority Data

Nov. 26, 2019 (EP) .................................... 19211496

(51) Int. Cl.
*H02M 7/483* (2007.01)
*B60L 53/20* (2019.01)
(Continued)

(52) U.S. Cl.
CPC .......... *H02M 7/4835* (2021.05); *B60L 53/20* (2019.02); *H02M 1/007* (2021.05); *H02M 7/49* (2013.01);
(Continued)

(58) Field of Classification Search
CPC ...... H02M 7/4835; H02M 1/007; H02M 7/49; H02M 1/0095; B60L 53/20; B60L 2210/30; H02J 2207/20; H02J 2207/50
See application file for complete search history.

(56) References Cited

U.S. PATENT DOCUMENTS 7,830,687 B2 * 11/2010 Du ......................... H02M 7/49
363/43
11,056,982 B2    7/2021 Weyh et al.
(Continued)

FOREIGN PATENT DOCUMENTS

DE           10217889 A1   11/2003
DE     202017102722 U1    6/2017
(Continued)

OTHER PUBLICATIONS

International Search Report & Written Opinion of the International Searching Authority dated Feb. 5, 2021 for International Application No. PCT/EP2020/082834.
(Continued)

*Primary Examiner* — Nha T Nguyen
(74) *Attorney, Agent, or Firm* — Eschweiler & Potashnik, LLC

(57) ABSTRACT

Disclosed herein is a multilevel converter (50) for voltage conversion between a three-phase AC voltage and a DC voltage, comprising three converter arms (58), each having a first end (60) for connecting to a corresponding phase of a three-phase AC voltage source (52) and a second end (62), wherein each converter arm (58) comprises a plurality of sequentially interconnected modules (64), a main energy store (54) having a positive terminal (76) connected or connectable to a positive conduction line (78) and a negative terminal (80), a switching arrangement (84), a control system (92), configured to establish a positive state, in which the negative conduction line (82) is connected with a star (Continued)

point (56) of said three-phase AC voltage source (52) and the positive conduction line (78) is connected with the second end (62) of one or two converter arms (58) to which a positive phase voltage is currently applied, and a negative state, in which the positive conduction line (78) is connected with said star point (56) of said three-phase AC voltage source, and the negative conduction line (82) is connected with the second end (62) of one or two converter arms (58) to which a negative phase voltage is currently applied.

22 Claims, 16 Drawing Sheets

(51) Int. Cl.
     *H02M 1/00*      (2006.01)
     *H02M 7/49*      (2007.01)

(52) U.S. Cl.
     CPC ....... *B60L 2210/30* (2013.01); *H02J 2207/20* (2020.01); *H02J 2207/50* (2020.01)

(56) References Cited

U.S. PATENT DOCUMENTS

| | | |
|---|---|---|
| 2005/0083716 A1 | 4/2005 | Marquardt |
| 2021/0111642 A1 | 4/2021 | Weyh et al. |
| 2021/0146791 A1* | 5/2021 | Hinterberger ......... B60L 15/007 |
| 2021/0151728 A1* | 5/2021 | Hinterberger ....... H01M 10/425 |

FOREIGN PATENT DOCUMENTS

| | | |
|---|---|---|
| DE | 102017108099 A1 | 10/2018 |
| DE | 102017108099 B4 | 3/2019 |

OTHER PUBLICATIONS

Maciel et al. "Three-Phase Four-Wire Shunt Active Power Filter with the Interconnection of Single-Phase and Three-Phase Converters" 2015 IEEE Energy Conversion Congress and Exposition (ECCE), published on Oct. 29, 2015.

Allebrod et al. "New Transformerless, Scalable Modular Multilevel Converters for HVDC-Transmission" Published in 2008.

Aros et al. "Dual-Inverter Circuit Topologies for Supplying Open-Ended Loads" Published Jun. 21, 2017.

Baiju et al. "A Dual Two-Level Inverter Scheme With Common Mode Voltage Elimination for an Induction Motor Drive" Published in May 2004.

Chang et al. "Improving the Overall Efficiency of Automotive Inverters Using a Multilevel Converter Composed of Low Voltage Si Mosfets" Published in Apr. 2019.

Helling et al. "Low Voltage Power Supply in Modular Multilevel Converter based Split Battery Systems for Electrical Vehicles" Published in 2018.

Kolar et al. "Novel Three-Phase AC-AC Sparse Matrix Converters" Published Sep. 2007.

Kouro et al. "Recent Advances and Industrial Applications of Multilevel Converters" Published Apr. 3, 2010.

Shin et al. "Power Loss Comparison with Different PWM Methods for 3L-NPC Inverter and 3LT Type Inverter" Published in 2014.

Si et al. "Asymmetrical Hybrid Multilevel Inverter with SHE Modulated NPC Cascaded by MPC Controlled CHB with Si/SiC Switches" Published in 2018.

Singer et al. "Modular Multilevel Parallel Converter based Split Battery System (M2B) for Stationary Storage Applications" Published in 2017.

\* cited by examiner

| Possibility | $z_1(400\,V)$ | $z_2(200\,V)$ | $z_3(100\,V)$ | $z_4(50\,V)$ | $U_{out} = \sum_{n=1}^{4} z_n \cdot U_{DC} \cdot 2^{n-1}\,[V]$ |
|---|---|---|---|---|---|
| 1 | 0 | 0 | 0 | 1 | 50 |
| 2 | 0 | 0 | 1 | -1 | 50 |
| 3 | 0 | 1 | -1 | -1 | 50 |
| 4 | 1 | -1 | -1 | -1 | 50 |

Fig. 10

MULTILEVEL CONVERTER FOR VOLTAGE CONVERSION BETWEEN A THREE-PHASE AC VOLTAGE AND A DC VOLTAGE

This Application is a National Phase Entry of PCT/EP2020/082834, filed on Nov. 20, 2020, which claims priority to European Application number 19211496.5, filed on Nov. 26, 2019. The contents of the above-referenced Patent Applications are hereby incorporated by reference in their entirety.

BACKGROUND OF THE INVENTION

In recent years, multilevel converters have been receiving increasing attention throughout a wide range of applications, including power systems, train traction, ship propulsion, automotive applications, power generation and conversion etc., as is e.g. summarized in S. Kouro, M. Malinowski, K. Gopakumar, J. Pou, L. G. Franquelo, B. Wu, J. Rodriguez, M. A. Perez, and J. I. Leon, "Recent advances and industrial applications of multilevel converters," IEEE Transactions on Industrial Electronics, vol. 57, no. 8, pp. 2553-2580, August 2010.

Compared to conventional two level converters, multilevel converters allow for higher efficiencies, smaller volume and improved performance. A modular multilevel converter (MMC) has first been described in DE 102 17 889 A1, and is further discussed e.g. in S. Allebrod, R. Hamerski, and R. Marquardt, "New transformerless, scalable modular multilevel converters for hvdc-transmission," in 2008 IEEE Power Electronics Specialists Conference, June 2008, pp. 174-179. Such MMC consists of one or more converter arms which are built up from a series connection of modules, each having a capacitor acting as an energy store, an input and an output terminal as well as switches allowing for selectively connecting the capacitors of adjacent modules in series, or bypassing or "deactivating" the capacitors in the series connection. By selecting a subset of module capacitors that are connected in series at any instance of time, a total voltage across the converter arm can be established.

In the original MMC, the capacitors in each module were typically identical, and intended to provide on average the same voltages during operation. In a recent patent publication, DE10 2017 108 099 A1, a new type of modular multilevel converter was disclosed, which may be referred to as "exponential modular multilevel converter" (EMMC). The EMMC allows for reducing cost and complexity as compared to the original MMC and is particularly suitable for low-voltage applications. The reduction in costs is mainly due to the fact that a much smaller number of modules is needed in the EMMC to provide a same output voltage divided in a same number of output voltage stages. For further details of the EMMC and an explanation of its operating principles, reference is made to DE10 2010 108 099 A1, the full content of which is incorporated herein by reference.

An example of an EMMC 10 is shown in FIG. 1. The EMMC 10 of FIG. 1 comprises only four cascaded modules 12 each having a first terminal 14, a second terminal 16, a capacitor 18 and a plurality of switches 20 (of which in FIG. 1 only one exemplary one is provided with a reference sign), which in the embodiment shown establish a full H-bridge topology. The cascaded connection of the four modules 12 forms a converter arm 22 having a first end 24 and a second end 26. While the EMMC 10 of FIG. 1 comprises only a single converter arm 22, it is to be understood that an EMMC may comprise several converter arms, such that the terms "converter arm" and "EMMC" are not synonymous.

For each two adjacent modules 12, the first terminal 14 of one module 12 is connected with the second terminal of the other module 12. By operating the switches 20, it is possible to connect the capacitor 18 of each module 12 selectively in series and in anti-series with the capacitor 18 of the adjacent module. The current voltages of the capacitors 18 connected in series and anti-series add up to a total voltage applied between the first and second ends 24, 26 of the converter arm 22. Moreover, the switches 20 also allow the module 12 to acquire a neutral or "deactivated" state, in which the capacitor 18 is bypassed, or in other words, not part of the series/anti-series connection and not contributing to the total voltage between the first and second ends 24, 26 of the converter arm 22.

In the EMMC of FIG. 1, the capacitor 18 of the uppermost module 12, also referred to as the "main module" in the following, is constantly connected to a DC voltage U0 provided by a DC voltage source 28. The capacitors 18 of the other three modules are in operation kept on voltages decreasing at a power of two, i.e. $U0/2^n$, with n=1, 2, 3, leading to voltage levels of 200 V, 100 V and 50 V. The exponentially decreasing voltages of the additional modules 12 give rise to the name "exponential" MMC (EMMC).

With the configuration shown, it is now possible to map an output voltage curve of the converter arm 22 with a step height of 50 V. The minimum step height corresponds to the voltage of the "smallest" additional module, i.e. the module 12 having the capacitor 18 with the smallest nominal voltage. This is immediately understandable from FIG. 2, in which only series connections (i.e. no anti-series connections) of selected modules 12 are illustrated. The table on the left shows for each output voltage between 0 V and 750 V which of the modules 12 are "on", i.e. incorporated in the series connections, which is marked by the symbol "x", with the remaining modules 12 being in the bypass state. The diagram on the right of FIG. 2 shows an exemplary waveform of voltages between the first and second ends 24, 26 of the converter arm 22 that can be obtained by successively switching the modules 12 to the states summarized in the table.

It is seen that in principle, voltages up to twice the main module voltage minus the smallest additional module voltage, in the shown case=750 V, can be mapped for the positive case. To output negative voltages, the modules shown in FIG. 1 are operated inverted, i.e. with −U0,−U0/2etc. By varying the step width, the system has a high degree of flexibility in approaching different output wave forms, including stepped approximations to sine functions with essentially arbitrary frequencies.

In the operation described so far, all of the active modules 12 are connected with same polarity, i.e. all positive or all negative. This can typically only be carried out for short periods of time, since a module that contributes with its voltage to the total voltage will be discharged by the load current. However, an individual module that is charged with opposite polarity to the total voltage over the converter arm 22 will be charged. Accordingly, by switching selected module capacitors 18 in anti-series with the predominant part of the modules (as far as the voltage contribution is concerned), this anti-serially connected module capacitor 18 can be charged upon operation, and since its voltage is in this case subtracted from the total voltage, this operation also allows for a larger variety of establishing desired output voltages.

This is illustrated in FIG. 3, where on the right a waveform oscillating between 0 V and 400 V is shown, and in the table on the left, possible output voltages of the individual modules 12 for establishing a total voltage "$U_A$" are summarized, wherein the main module is designated by "HM", and the additional modules are designated by "ZM1", "ZM2", and "ZM3", respectively. As seen from the tables, each total voltage level $U_A$ other than 0 V and 400 V can be generated by two or more different switching states.

More precisely, both tables in FIG. 3 illustrate the positive rise and fall of the voltage with time as shown in the diagram on the right. The first sequence summarized in the left table starts with sufficiently charged capacitors (state of charge "+"), while in the second sequence (right table) the capacitors of the additional modules ZM2 (100 V) and ZM3 (50 V) are not sufficiently charged at the beginning (state of charge "−") and should therefore be switched anti-serially and thus inverted into the path at the first use. In the chronological sequence of the individual switching states, the alternating use of the additional modules in charging and discharging mode can be seen. The main module HM can be positively switched on at any time if required, since it is connected with the DC current source as seen in FIG. 1. The logic for determining the next switching state follows the principle of deliberately building up a voltage deficit and increasing it exponentially until the main module compensates at the latest.

In contrast to the "all positive case" shown in FIG. 2, however, it is no longer always possible to exceed the basic module voltage of 400 V as the maximum voltage. Instead, in the combined charging/discharging variant of FIG. 3, where at least some of the capacitors 18 are connected in anti-series and in which selected capacitors 18 are hence connected with opposite polarity than the total voltage $U_A$, the maximum total voltage is limited to the main module voltage, in this case 400 V.

In view of the possibility to invert selected capacitors 12 for charging, the requirements for the capacities of the capacitors 12 are greatly diminished. The reason is that different module states can be switched one after the other while still leading to the same total voltage $U_A$, thereby allowing the charge or voltage states of all module capacitors to be balanced at any time.

FIG. 4 shows a detailed example of the first two voltage stages of the waveform of FIG. 3, namely 50 V and 100 V, each with four different switching states. Within the individual switching states, both the discharging of positively switched and the charging of negatively switched capacitors result in a continuous voltage drop, with the voltage tolerance of the individual capacitors being set to ±1V, for example. The possible number of intermediate stages is only limited by an upper limit of the reasonably possible switching frequency.

In the example shown in FIG. 1, a voltage $U_0$ of 400 V of the DC current source has been selected because in most electric vehicles, the batteries provided for traction motors have batteries with a nominal voltage of 400 V. The (single phase) EMMC 10 of FIG. 1 could hence be used to charge a 400 V battery with an AC voltage with an amplitude of 400 V, or somewhat below this. Notably, in the mains network of many European countries, three-phase electric power is provided having three phases with effective voltages of of 230 V, i.e. with an amplitude of $230V \cdot \sqrt{2} = 325.3$ V, and a phase shift of 120°. However, it would not be satisfactory to simply use the 325.3 V AC of only one phase of the three-phase electric power network across the converter arm 22 of the converter of FIG. 1 to charge the 400 V battery, for two reasons. The first reason is that in principle, it is advantageous if the loads on all three phases of the three-phase electric network are balanced in operation. The second reason is that in ordinary electrical outlets that would typically be used for charging, the maximum current is limited by fuse protection per phase, for example to not exceed 16 A or 32 A, such that only ⅓ of the theoretically available power at the outlet can actually be used for charging, thereby failing to enable short charging times.

A three-phase multilevel converter based on the EMMC design according to the preamble of claim 1 has already been proposed in the aforementioned DE 10 2017 108 099 A1, and is cited in FIG. 5. This three-phase multilevel converter comprises three converter arms 22a, 22b and 22c each comprising three modules 12 which are of similar structure as those shown in FIG. 1. However, instead of a dedicated main module with a corresponding DC source for each converter arm 22a, 22b and 22c, a single DC voltage source providing a voltage of 2U0 is provided, which is shared between all three converter arms 22a, 22b and 22c. The DC voltage source has a positive terminal 30 connected to a positive conduction line 32 and a negative terminal 34 connected to a negative conduction line 36, and a switching arrangement 38 for selectively connecting said positive and negative conduction lines with selected second ends of said converter arms 22a, 22b and 22c. Note that contrary to the terminology used in the description of FIG. 1, the converter arms 22a, 22b and 22c of FIG. 5 only include the lower three modules 12, whose capacitors are not permanently connected with the DC voltage source 28, while the switching arrangement 38 together with the single capacitor 18 and the single DC voltage source 28 replaces the main module of FIG. 1.

As seen in FIG. 5, the switching arrangement 38 comprises three half-bridge branches 40, each connected between the positive and negative conduction lines 32, 36 and comprising a series connection of a high-side switch which 42 is closer to said positive conduction line 32 and a low-side switch 44 which is closer to said negative conduction line 36. The second end 26 of each converter arm 22a, 22b and 22c is connected with an intermediate point between the high- and low-side switches in each half-bridge branch.

As is emphasized in paragraph [0101] of DE 10 2017 108 099 A1, this converter can only provide positive voltages between 0 V and 2U0 at each of its "outputs", i.e. first ends 24 of the converter arms 22a, 22b and 22c. However, the three converter arms 22a, 22b and 22c can be controlled with respect to each other such that a symmetrical three-phase current system is established. Moreover, if the DC current source 28 has a center tap, such center tap may be used as the star point for the three phases.

Notably, it is seen that the three-phase EMMC of FIG. 5 would use AC voltages with an amplitude of U0 to charge a battery 28 having a voltage of 2U0. In other words, in order to efficiently charge a battery using e.g. three-phase 230 V current as provided by the mains network in Europe, U0 would be $230V \cdot \sqrt{2} = 325.3$ V (when employing star voltages) or $400V \cdot \sqrt{2} = 565.7$ V (when using line-to-line voltages), in which case the battery would need to have a voltage of way beyond 600 V, rather than 400 V. For this reason, it is currently not possible to charge 400 V batteries with a three-phase EMMC type converter using 230 V three-phase networks.

While it would appear in principle possible to use higher AC voltage amplitudes than U0 to charge the battery having a voltage of 2U0, a closer inspection of the operation mechanism of the EMMC reveals that in this case, the power efficiency decreases significantly.

Note that the difference in this regard with respect to the one-phase EMMC FIG. 1 is due to the fact that in the latter, the polarity of the main module which is permanently connected with the DC current source 28 can be inverted, as it is integrated in a full H-bridge switching topology. It would not be possible to simply do the same with the three-phase module, however, because in a three-phase setup, there are always two phases which have an opposite sign, which would lead to short circuits between voltages of opposite signs associated with different phases. For this reason, the three-phase EMMC of FIG. 5 deliberately only uses positive voltages and half-bridge circuits.

Therefore, according to the current state of the art, in order to charge a battery using a three-phase EMMC with 230/400 V three-phase current as provided by the mains network, one would either have to use a transformer to transform the voltage, or one would use an 800 V battery which is split into 400 V blocks and employing a Neutral Point Clamped Converter (NPC), such as the ones exemplary shown in FIG. 6. The NPC on the left of FIG. 6 uses six switches for each phase, the NPC on the right uses only four switches and two diodes per phase. However, these possible variants require a comparatively large number of components which increases the costs of the three-phase EMMC.

SUMMARY OF THE INVENTION

The problem underlying the invention is to provide a cost efficient three-phase converter that inter alia allows for charging a battery having a nominal DC voltage of U0 with three-phase current having an amplitude of ±U0, or lower. Herein, the term "inter alia" is to indicate that although this type of battery charging is currently regarded as a particularly important use which motivates the invention, the three-phase converter of the invention can also be used for other purposes, where a one- or bidirectional voltage conversion between a three-phase AC voltage and a DC voltage is needed.

This problem is solved by a multilevel converter of claim 1 as well as by a method of claim 12. Favorable embodiments are defined in the dependent claims.

According to a first aspect, the present invention provides a multilevel converter for voltage conversion between a three-phase AC voltage and a DC voltage, comprising
three converter arms, each having a first end for connecting to a corresponding phase of a three-phase AC voltage source and a second end, wherein each converter arm comprises a plurality of sequentially interconnected modules, wherein each module comprises
  at least one first terminal and at least one second terminal,
  a storage element for electrical energy, in particular a capacitor, and
  a plurality of module switches,
wherein in each two adjacent modules, the at least one first terminal of one module is connected either directly or via an intermediate component to the at least one second terminal of the other module. The plurality of module switches of the modules allow for selectively deactivating the energy storage element of each module, for connecting energy storage elements of adjacent modules in series, and for connecting energy storage elements of at least some adjacent modules in anti-series. Herein, the term "anti-series connection" refers to a series connection with reversed polarity, and the expression "deactivating a storage element" generally refers to a state in which it does not contribute to the series or and anti-series connection of storage elements. In specific embodiments shown herein, a "deactivated" storage element is "bypassed" in the series or anti-series connection of the storage elements of other modules. Moreover, while in preferred embodiments, indeed all adjacent modules can be connected selectively in anti-series, it is likewise conceivable to provide this degree of freedom for only a subset of the modules.

The multilevel converter of the invention further comprises a main energy store, in particular a battery, or interfaces for connecting with such main energy store, said main energy store having a positive terminal connected or connectable to a positive conduction line and a negative terminal connected or connectable to a negative conduction line of the converter. Accordingly, while the converter of the invention is always devised for cooperation with a certain type of main energy store, this main energy store need not necessarily be part of the claimed entity. For example, the main energy store could be a 400 V battery already present in an electric vehicle, and the converter of the invention could then be added to such a vehicle by connecting the converter with said battery via said interfaces. These interfaces could for example be formed by two electrical connectors for connecting the positive and negative conduction lines of the converter with the positive and negative terminals of said energy store, respectively.

The converter of the invention further comprises a switching arrangement for selectively connecting said positive and negative conduction lines with selected second ends of said converter arms, and a control system for controlling said switching arrangement based on the current phase voltages of said three-phase voltage source. Herein, the switching arrangement is configured to establish, under the control of said control system,
  a positive state, in which the negative conduction line is connected with a star point of said three-phase AC voltage source and the positive conduction line is connected with the second end of one or two converter arms to which a positive phase voltage is currently applied, and
  a negative state, in which the positive conduction line is connected with said star point of said three-phase AC voltage source, and the negative conduction line is connected with the second end of one or two converter arms to which a negative phase voltage is currently applied,
wherein said positive and negative states are established alternatingly, but not simultaneously.

With this design, it is inter alia possible to very efficiently charge a battery having a nominal DC voltage of U0 with three-phase current having an amplitude of ±U0 or smaller, allowing e.g. to match three-phase electrical power at 230/400 V in the European mains network with 400 V batteries as commonly used in electric vehicles. This will be shown with reference to an explicit embodiment below. However, it is important to note that the multilevel converter of the invention is not limited to this specific or any specific application, but can generally be used for any conceivable one-or bidirectional voltage conversion between a three-phase AC voltage and a DC voltage in various applications.

In said positive state, the second end of each converter arm to which currently a negative voltage is supplied is preferably disconnected at least from the positive conduction line. Herein the expression "disconnected at least from the positive conduction line", implies that it may be connected with the negative conduction line, which is the currently preferred embodiment. However, it is also conceivable that it would be disconnected from both, the positive and the negative conduction lines. Similarly, in said negative state, the second end of each converter arm to which currently a positive voltage is supplied is preferably disconnected at least from the negative conduction line.

In a preferred embodiment, said switching arrangement comprises three half-bridge branches, each connected between said positive and negative conduction lines and comprising a series connection of a high-side switch which is closer to said positive conduction line and a low-side switch which is closer to said negative conduction line, wherein the second end of each converter arm is connected with an intermediate point between the high- and low-side switches in a corresponding one of the half-bridge branches.

Herein, in establishing said positive state, the control system is preferably configured to close the high-side switch and to open the low-side switch in at least one half-bridge branch connected with a converter arm to which a positive phase voltage is currently applied, and to open at least the high-side switch in each half-bridge branch connected with a converter arm to which a negative phase voltage is currently applied. Moreover, in establishing said negative state, the control system is configured to close the low-side switch and to open the high-side switch in at least one half-bridge branch connected with a converter arm to which a negative phase voltage is currently applied, and to open at least the low-side switch in each half-bridge branch connected with a converter arm to which a negative phase voltage is currently applied.

In a preferred embodiment, said switching arrangement comprises a fourth half-bridge branch connected between said positive and negative conduction lines and comprising a series connection of a high-side switch which is closer to said positive conduction line and a low-side switch which closer to said negative conduction line, wherein an intermediate point between the high- and low-side switches in the fourth half-bridge branch is connected with said star point of said three-phase AC voltage source, and said control system is configured to control said high-side and low-side switches of the fourth half-bridge to be open and closed, respectively, in the positive state, and to be closed and open, respectively, in the negative state.

In a preferred embodiment, said three-phase AC source provides three sinusoidal voltage phases having an identical amplitude $U_P$, or amplitudes that differs at most by ±10% from each other, and a mutual phase shift of 120°±10%. Herein, said main energy store has a nominal voltage $U_0$, wherein the following relationship applies:

$U_P = a \cdot U_0$, wherein $a \leq 1.0$, preferably $a \leq 0.85$. Herein, preferably $U_0 = 400$ V±10% and $U_P = 325.3$ V±10%.

Note that in some embodiments, $U_P$ may be as low as the lowest nominal voltage of the energy storage elements of any of said modules. In some embodiments, $a \geq 0.2$, preferably a 0.4.

In a preferred embodiment, said main energy store is a battery of an electric vehicle, and the multilevel converter serves as a charging converter for charging said battery using three-phase electric power.

In a preferred embodiment, the multilevel converter employs an EMMC design, in which the main energy store has a nominal voltage $U_0$, wherein said multilevel converter comprises $1^{st}$ to M-th modules, and wherein the energy storage elements of the n-th module among said modules has a nominal voltage $U0/2^n$, with $n = 1 \ldots M$. Herein, the number M of modules is preferably chosen such that $2 \leq M \leq 6$, more preferably $3 \leq M \leq 5$, and most preferably $4 \leq M \leq 5$.

In a preferred embodiment, said control system is configured to balance the voltages of the energy storage elements of said modules, by determining a number of possible switching states of the individual modules that lead to a desired voltage between the first and second ends of a converter arm, and by selecting switching states among said possible switching states such that the voltages of the energy storage elements on average approach their nominal values.

In a preferred embodiment, the control system is configured to establish a plurality of different switching states among said possible switching states of the individual modules one after another while maintaining the voltage between the first and second ends of said converter arm.

A further aspect of the invention relates to a method for converting a voltage between a three-phase AC voltage and a DC voltage using a multilevel converter, wherein said multilevel converter comprises three converter arms, each having a first end for connecting to a corresponding phase of a three-phase AC voltage source and a second end, wherein each converter arm comprises a plurality of sequentially interconnected modules, wherein each module comprises at least one first terminal and at least one second terminal,
a storage element for electrical energy, in particular a capacitor, and
a plurality of module switches, wherein in each two adjacent modules, the at least one first terminal of one module is connected either directly or via an intermediate component to the at least one second terminal of the other module, a main energy store, in particular a battery, or interfaces for connecting such main energy store, said main energy store having a positive terminal connected or connectable to a positive conduction line and a negative terminal connected or connectable to a negative conduction line of said converter, a switching arrangement for selectively connecting said positive and negative conduction lines with selected second ends of said converter arms, and a control system for controlling said switching arrangement based on the current phase voltages of said three-phase voltage source.

The method comprises operating said plurality of module switches of the modules such as to one or more of selectively deactivate the storage element of a given module, connect storage elements of adjacent modules in series, and connect storage elements of adjacent modules in anti-series, to thereby establish a predetermined voltage between the first and second ends of said converter arm, wherein the method further comprises establishing alternatingly, but not simultaneously, a positive state, in which the negative conduction line is connected with a star point of said three-phase AC voltage source and the positive conduction line is connected with the second end of one or two converter arms to which a positive phase voltage is currently applied, and a negative state, in which the positive conduction line is connected with said star point of said three-phase AC voltage source, and the negative conduction line is connected with the second end of one or two converter arms to which a negative phase voltage is currently applied.

In a preferred embodiment of the method, in said positive state, the second end of each converter arm to which currently a negative voltage is supplied is disconnected at least from the positive conduction line, and in said negative state, the second end of each converter arm to which currently a positive voltage is supplied is disconnected at least from the negative conduction line.

In a preferred embodiment, said switching arrangement comprises three half-bridge branches, each connected between said positive and negative conduction lines and comprising a series connection of a high-side switch which is closer to said positive conduction line and a low-side switch which is closer to said negative conduction line, wherein the second end of each converter arm is connected with an intermediate point between the high- and low-side switches in a corresponding one of the half-bridge branches.

In establishing said positive state, in preferred embodiments, the high-side switch is closed and the low-side switch is opened in at least one half-bridge branch connected with a converter arm to which a positive phase voltage is currently applied, and at least the high-side switch in each half-bridge branch connected with a converter arm to which a negative phase voltage is currently applied is opened, and wherein in establishing said negative state, the low-side switch is closed and the high-side switch in at least one half-bridge branch connected with a converter arm to which a negative phase voltage is currently applied is opened, and at least the low-side switch in each half-bridge branch connected with a converter arm to which a positive phase voltage is currently applied is opened.

In a preferred embodiment of the method, said switching arrangement comprises a fourth half-bridge branch connected between said positive and negative conduction lines and comprising a series connection of a high-side switch which is closer to said positive conduction line and a low-side switch which closer to said negative conduction line, wherein an intermediate point between the high- and low-side switches in the fourth half-bridge branch is connected with said star point of said three-phase AC voltage source, and said high-side and low-side switches of the fourth half-bridge are controlled to be open and closed, respectively in the positive state, and to be closed and open, respectively, in the negative state.

In a preferred embodiment of the method, said three-phase AC source provides three sinusoidal voltage phases having an identical amplitude $U_p$, or amplitudes that differ at most by ±10% from each other, and a mutual phase shift of 120°±10%.

In a preferred embodiment of the method, said main energy store (76) has a nominal voltage $U_0$, and wherein the following relationship applies:

$U_P = a \cdot U_0$, wherein $a \leq 1.0$, preferably $a \leq 0.85$. Herein, preferably $U_0 = 400$ V±10% and $U_P = 325.3$ V±10%.

In a preferred embodiment of the method, said main energy store is a battery of an electric vehicle, and the multilevel converter serves as a charging converter for charging said battery using three-phase electric power.

In a preferred embodiment of the method, the main energy store has a nominal voltage $U_0$, wherein said multilevel converter comprises $1^{st}$ to M-th modules, and wherein the energy storage elements of the n-th module among said modules has a nominal voltage $U0/2^n$, with $n=1 \ldots M$, wherein preferably $2 \leq M \leq 6$, more preferably $3 \leq M \leq 5$, and most preferably $4 \leq M \leq 5$.

Preferably, the method further comprises a step of balancing the voltages of the energy storage elements of said modules, by determining a number of possible switching states of the individual modules that lead to a desired voltage between the first and second ends of a converter arm, and by selecting switching states among said possible switching states such that the voltages of the energy storage elements on average approach their nominal values.

In a preferred embodiment, the method comprises a step of establishing a plurality of different switching states among said possible switching states of the individual modules one after another while maintaining the voltage between the first and second ends of said converter arm.

BRIEF DESCRIPTION OF THE DRAWINGS

FIG. 10 shows a table summarizing possible module switching states for a given converter arm output voltage (50V).

DESCRIPTION OF THE PREFERRED EMBODIMENT

Various embodiments and aspects of the invention will be described with reference to details discussed below, and the accompanying drawings will illustrate the various embodiments. The following description and drawings are illustrative of the invention and are not to be construed as limiting the same. Numerous specific details are described to provide a thorough understanding of various embodiments of the present invention. However, in certain instances, well-known or conventional details are not described in order to provide a concise discussion of embodiments of the present invention.

Figure 7:
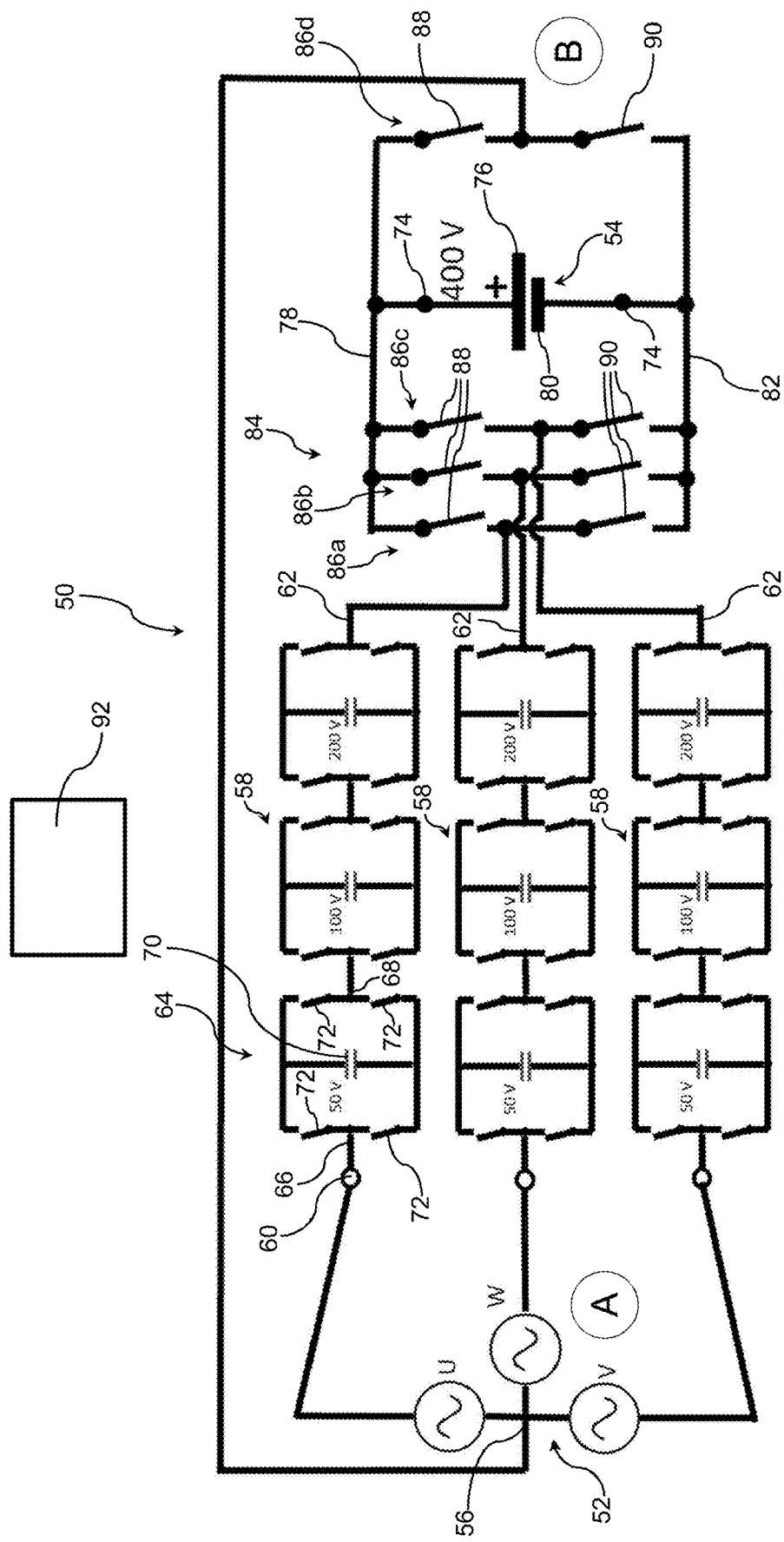
FIG. 7 shows a multilevel converter according to an embodiment of the invention.

FIG. 7 shows a multilevel converter 50 for voltage conversion between a three-phase voltage provided by a voltage source 52 and a DC voltage of a battery 54. The voltage source 52 in the shown embodiment could be the mains network, providing three phases U, W, V at effective voltages of 230 V, with an amplitude of 230V·√2=325.3 V and having a star point 56.

Figure 1:
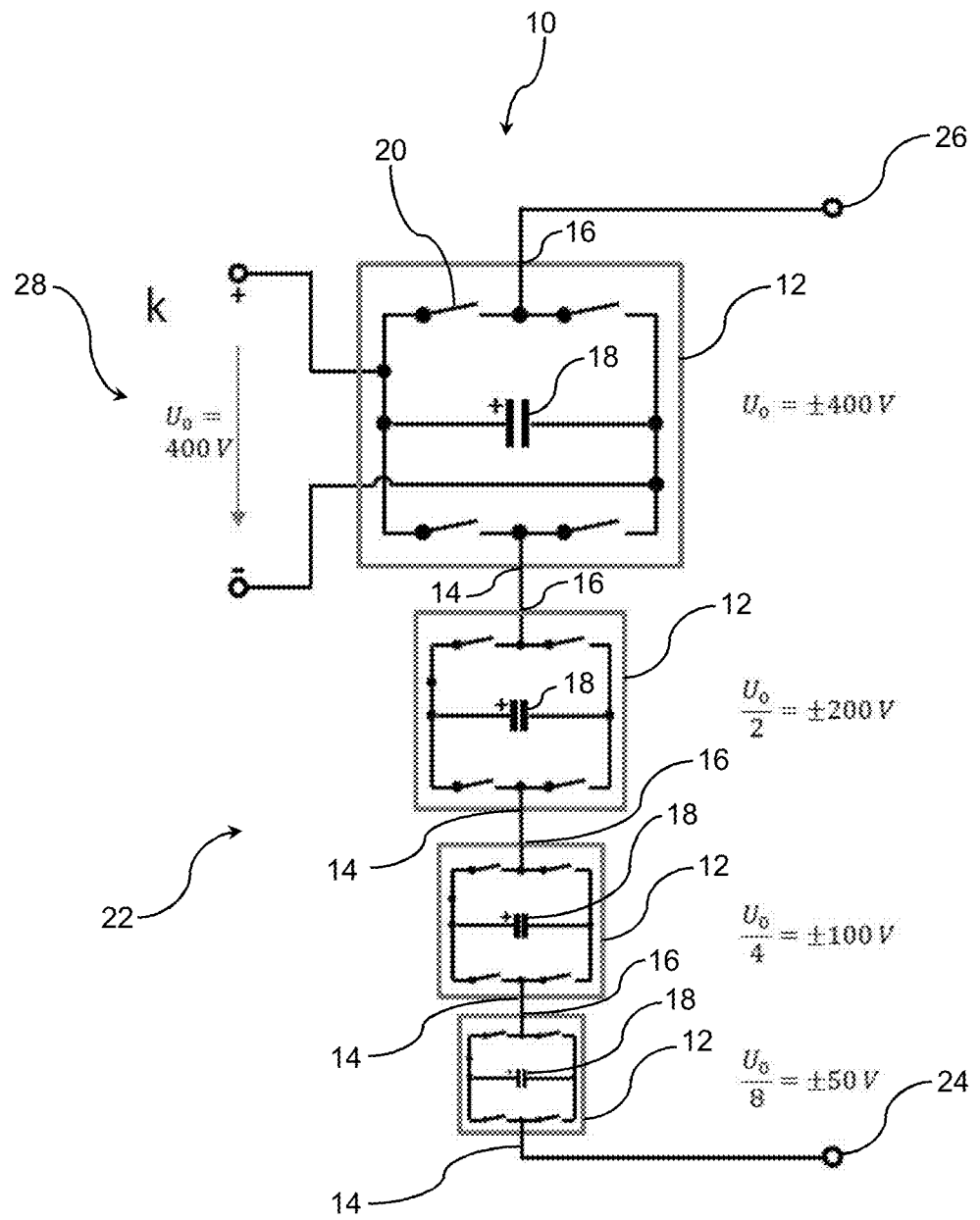
FIG. 1 is a schematic view of an exponential modular multilevel converter (EMMC).
Figure 2:
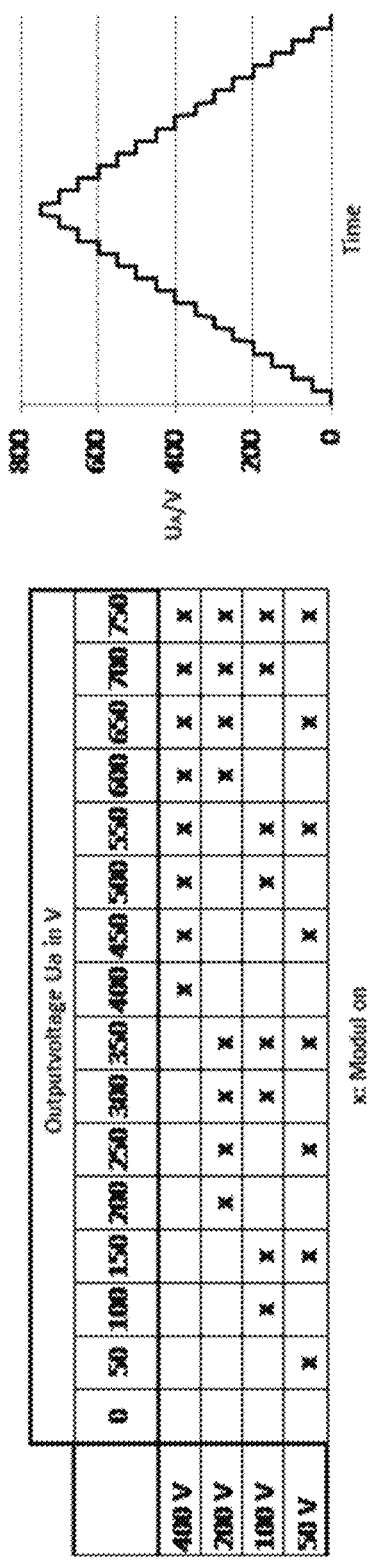
FIG. 2 shows a waveform of an output voltage of the EMMC of FIG. 1 and a table of corresponding module switching states.
Figure 3:
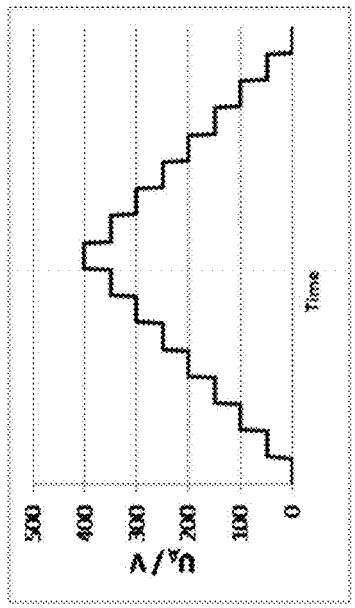
FIG. 3 shows a waveform of an output voltage of the EMMC of FIG. 1 and two tables of associated module switching states.
Figure 3:
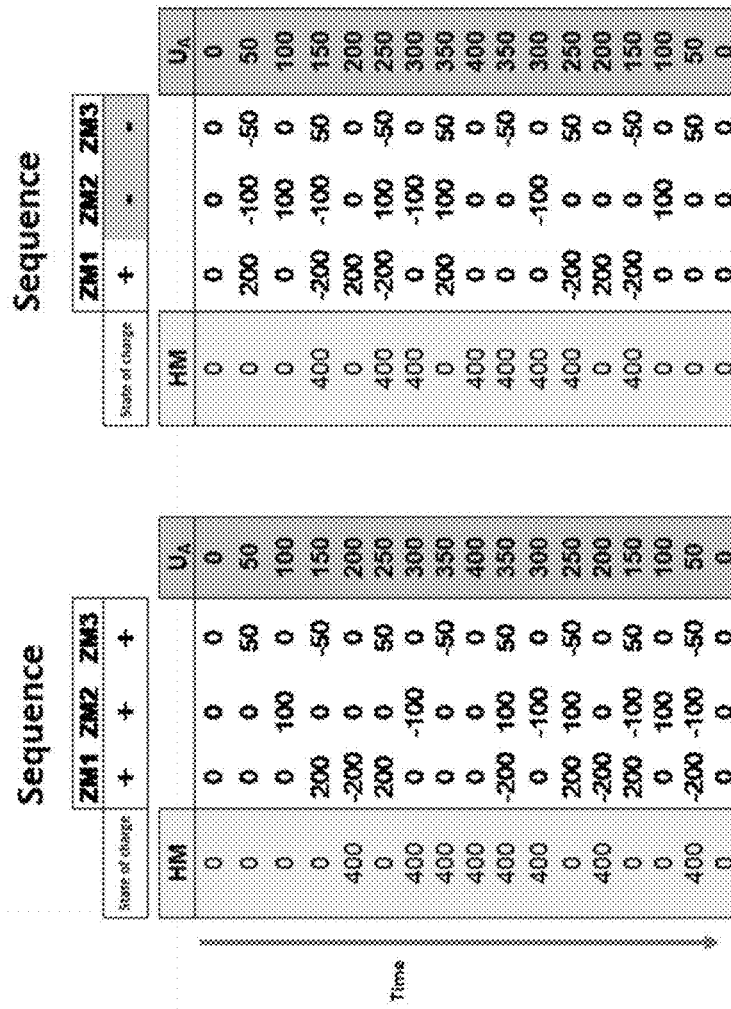
Figure 4:
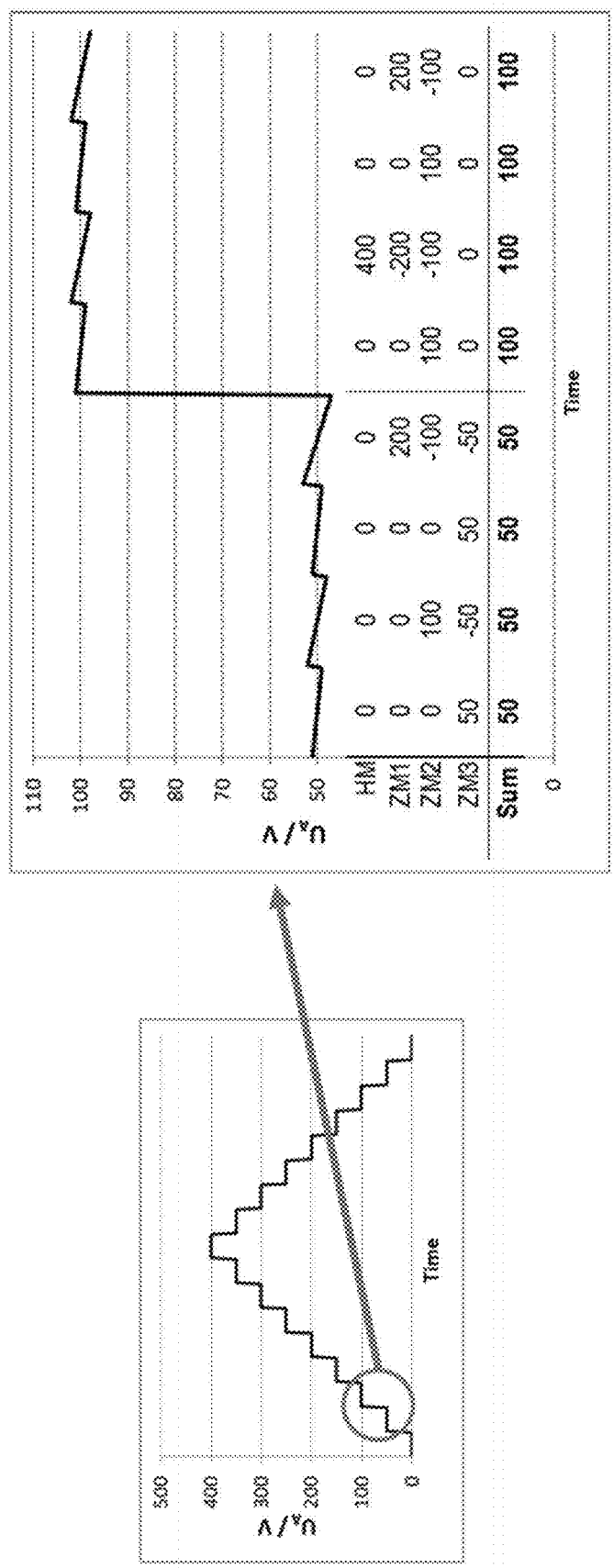
FIG. 4 shows a detailed example of the first two voltage stages of the waveform of FIG. 3, incorporating four different module switching states.
Figure 5:
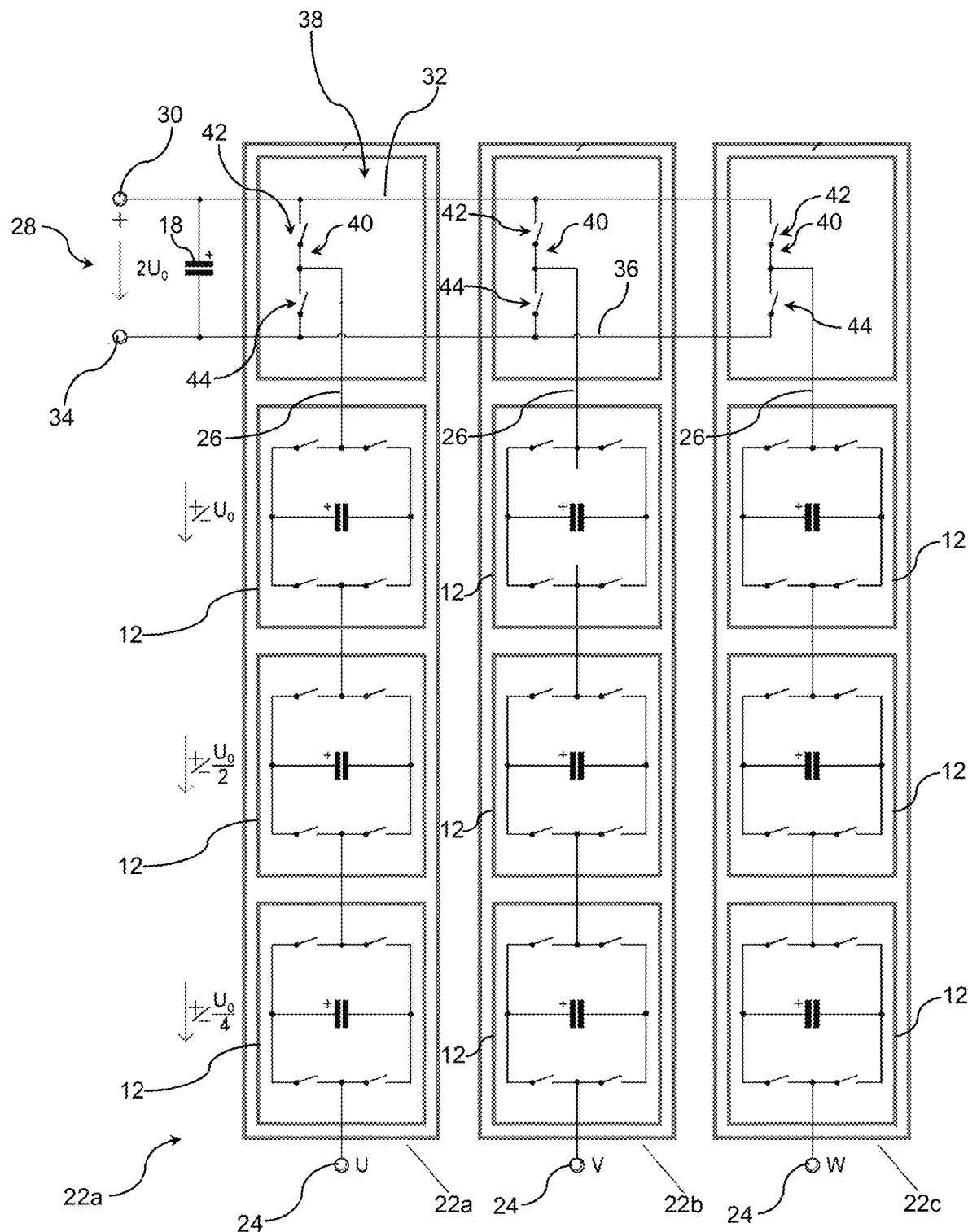
FIG. 5 shows a prior art multilevel converter.
Figure 6:
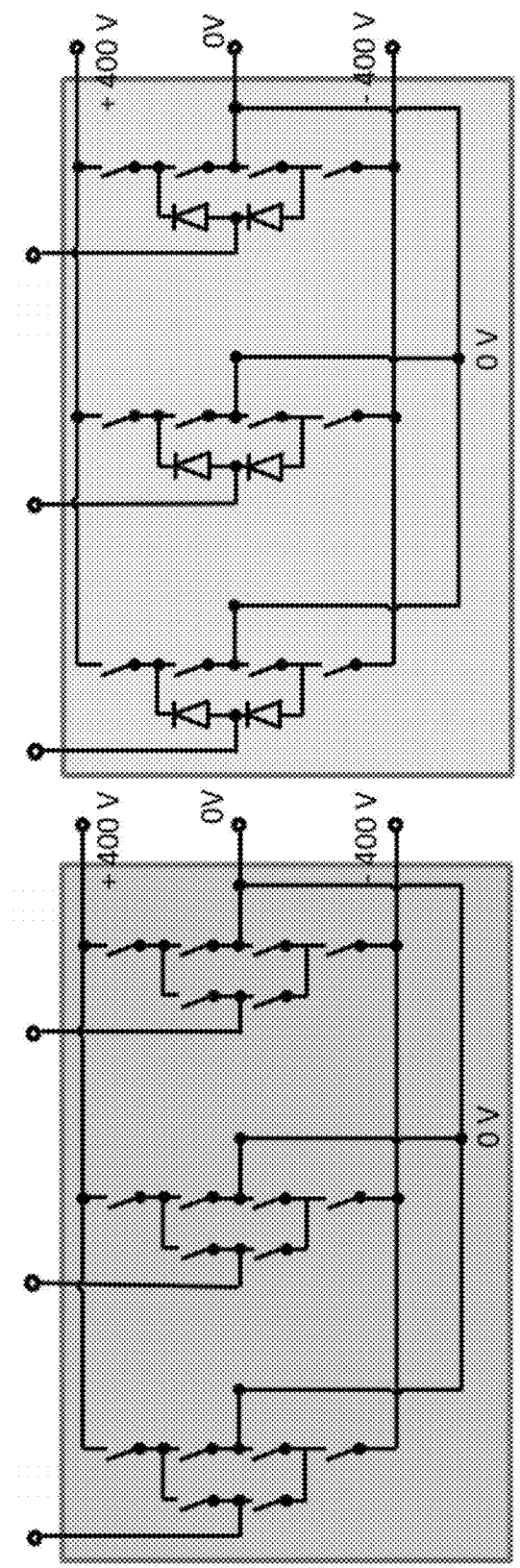
FIG. 6 shows a prior art Neutral Point Clamped Converter.

The multilevel converter 50 has three converter arms 58, each having a first end 60 connected with a corresponding phase U, V, or W of said three-phase AC voltage source 52. Each of the converter arms 58 comprises three sequentially interconnected modules 64 which are per se identical with the module as shown in FIG. 1. Similarly to what is shown in FIG. 1, each of the modules 64 comprises a first terminal 66, a second terminal 68, and a storage element for electrical energy, which in the embodiment shown is formed by a capacitor 70. For clarity, reference signs are only added to the leftmost module 64 in the upper converter arm 58 shown in FIG. 7, which however apply to each of the nine modules 64 shown in FIG. 7. Moreover, each of the modules 64 comprises four module switches 72. Each of the modules 64 has a full H-bridge topology, allowing for selectively deactivating (i. e. in this case bypassing) the capacitor 70 of each module 64, for connecting capacitors 70 of adjacent modules 64 in series, and for connecting capacitors 70 of adjacent modules 64 in anti-series.

Further, the converter 50 is shown to comprise the battery 54, which however does not need to be part of the converter 50 proper. Instead, it is sufficient if the converter 50 has interfaces, as schematically shown at reference signs 74 in FIG. 7, for connecting the battery 54 with the converter 50. The battery 54 has a positive terminal 76 connected or connectable with a positive conduction line 78 and a negative terminal 80 connected or connectable with a negative conduction line 82.

Moreover, a switching arrangement 84 is provided for selectively connecting said positive and negative conduction lines 78, 82 with selected second ends 62 of said converter arms 58. In the embodiment shown, the switching arrangement 84 comprises three half-bridge branches 86a to 86c, which are each connected between said positive and negative conduction lines 78, 82 and which each comprise a series connection of a high-side switch 88, which is closer to said positive conduction line 78, and a low-side switch 90, which is closer to said negative conduction line 82. The second end 62 of each converter arm 58 is connected with an intermediate point between the high- and low-side switches 88, 90 in each half-bridge branch 86a to 86c.

The switching arrangement 84 further comprises a fourth half-bridge branch 86d connected between said positive and negative conduction lines 78, 82, which likewise comprises a series connection of a high-side switch 88 which is closer to said positive conduction line 78 and a low-side switch 90 which closer to said negative conduction line 82. An intermediate point between the high- and low-side switches 88, 90 in the fourth half-bridge branch 86d is connected with the star point 56 of said three-phase AC voltage source 52.

Finally, a control system 92 is provided which is configured to control the switching of the module switches 72 of each of the modules 64 as well as the switching arrangement 84. For clarity, data links connecting the control system 92 with the modules 64 and switching arrangement 84 have been omitted. Such data links could be provided by wires, data buses, or wireless connections. The control system 92 is configured to receive information regarding the current voltage value associated with each phase U, V and W and of the charging state of each capacitor 70 of each of the modules 64 and controls switching of the module switches 72 of each of the modules 64 and of the switching arrangement 84 based on this information. The control system 92 could be a single electronic control unit, comprising one or more microprocessors, ASICs or the like, or could be a distributed control system, for example a distributed control system comprising a central controller communicating with individual control units associated with each module 64 and the switching arrangement 84 or the like. The control system 92 can be embodied in hardware, software, or in a combination of both.

For comparison with the single-phase converter FIG. 1, it is to be noted that in the three-phase MMC or EMMC as shown in FIG. 7, the converter arms 58 do not each include a dedicated main module connected with a DC source. Instead, the single battery 54, together with the switching arrangement 84 acquires the function of such main module of the EMMC of FIG. 1.

Figure 8:
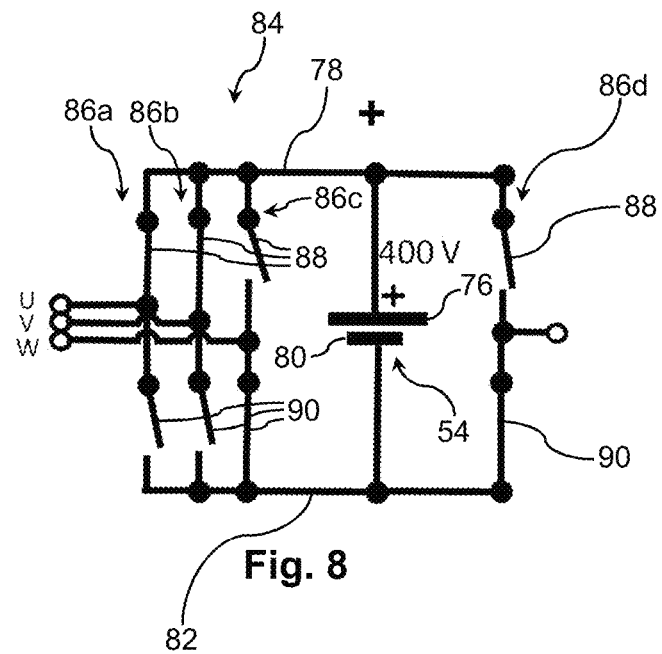
FIG. 8 shows the switching arrangement of the multilevel converter of FIG. 7 in the positive state.
Figure 9:
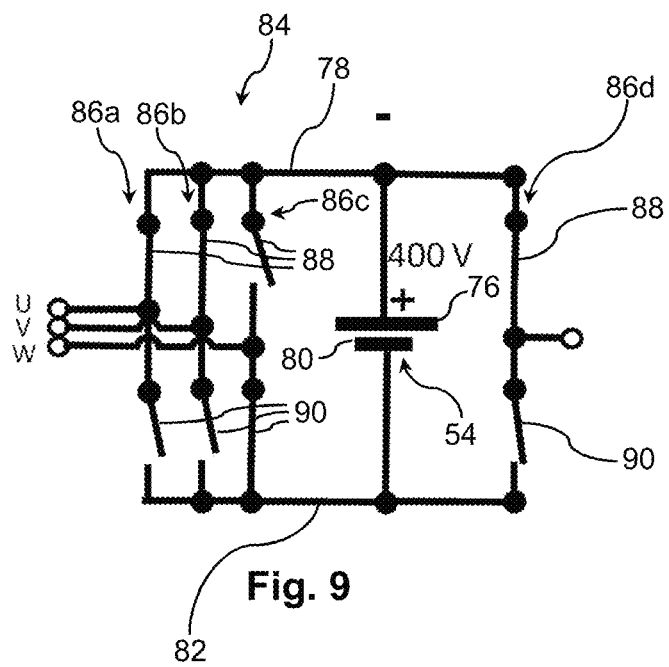
FIG. 9 shows the switching arrangement of the multilevel converter of FIG. 7 in the negative state.

The control system 92 is configured to control the switching arrangement 84 to selectively establish a selected one of a positive state shown in FIG. 8 and a negative state shown in FIG. 9, but never both states simultaneously. Moreover, while not explicitly shown, the switching arrangement 84 can in preferred embodiments also be switched into a deactivated state in which the battery 50 is bypassed. This state is for example useful for short time intervals in which only the capacitors 70 of the modules 64 are charged.

When establishing the positive state, the control system 92 controls the high-side switch 88 to close and the low-side switch 90 to open in at least one half-bridge branch 86a, 86b, 86c connected with a converter arm 58 to which a positive phase voltage is currently applied (in FIG. 8, the half-bridge branches 86a and 86b associated with phases U and V), and to open at least the high-side switch 88 in each half-bridge branch 86a, 86b and 86c to which a negative phase voltage is currently applied (in FIG. 8, the half-bridge branch 86c associated with phase W). Moreover, the high-side switch 88 of the fourth half-bridge branch 86d is open and the low-side switch 90 thereof is closed. As a result of that, the negative conduction line 82 is connected with the star point 56 of the three-phase AC voltage source 52, and the positive conduction line 78 is connected with the second end of one or two converter arms 58 to which a positive phase voltage is currently applied. This is shown in FIG. 8, where it is assumed that the voltages of the phases U and V are currently positive and the voltage of phase W is negative. Note that in FIG. 8, only the switching arrangement 84 is shown for clarity, i.e. the converter arms 58 between the three-phase AC voltage source 52 and the switching arrangement 84 are omitted.

Conversely, when establishing the negative state, the control system 92 controls the high-side switch 88 to open and the low-switch 90 to close in at least one half-bridge branch 86a, 86b, 86c connected with a converter arm 58 to which a negative phase voltage is currently applied (in FIG. 9, the half-bridge branch 86c associated with phase W), and to open at least the low-side switch 90 in each half-bridge branch 86a, 86b and 86c to which a positive phase voltage is currently applied (FIG. 9, the half-bridge branches 86a and 86b associated with phases U and V). Moreover, the high side switch 88 of the fourth half-bridge branch 86d is closed and the low side switch 90 thereof is opened. As a result of that, the positive conduction line 78 is connected with the star point 56 of said three-phase AC voltage source 52, and the negative conduction line 82 is connected with the second end of one or two converter arms 58 to which a negative phase voltage is currently applied (in this case, phase voltage W).

Along with alternatingly establishing the positive and negative states, the control system 92 is configured to control the switching states of the module switches 72 of each module 64 in such a manner that at each instance in time, a desired voltage is generated at the first end 60 of each converter arm 58, by selectively switching the switches 72 of each of the modules 64 to acquire the series connection, the anti-series connection or the deactivated state. Herein, the "desired voltage" is a voltage, that—together with the voltage of the battery 54 connected in the positive or negative state—matches the current phase voltage of phases U, V and W for the desired purpose. Or, described from another point of view, the desired voltage could be a voltage that, when combined with the current phase voltage applied at the first end of the converter arm 58, matches the voltage of the battery 54.

Figure 7A:
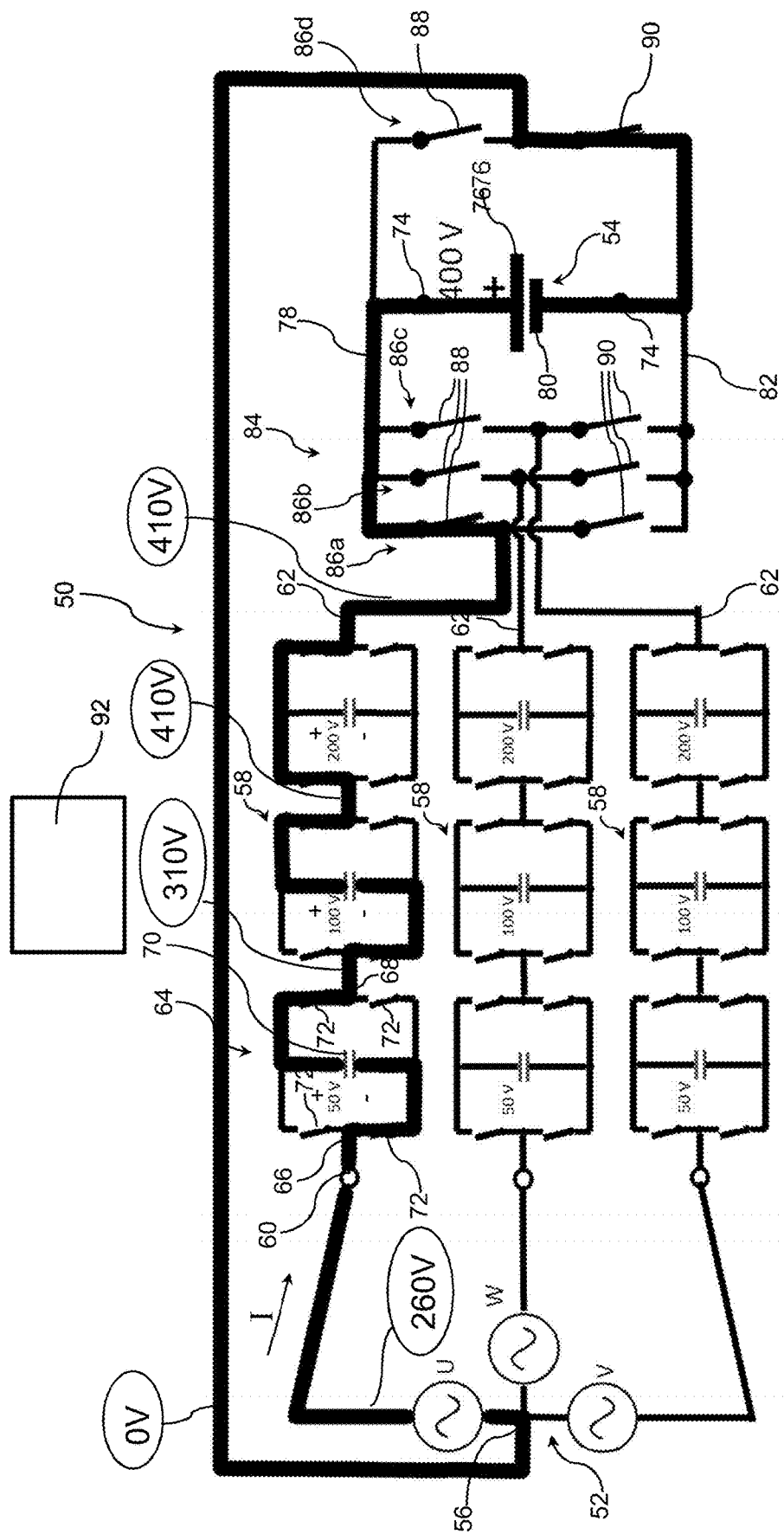
FIG. 7*a* shows the multilevel converter of FIG. 7, in which a specific configuration of module switching states is shown for one converter arm.
Figure 7B:
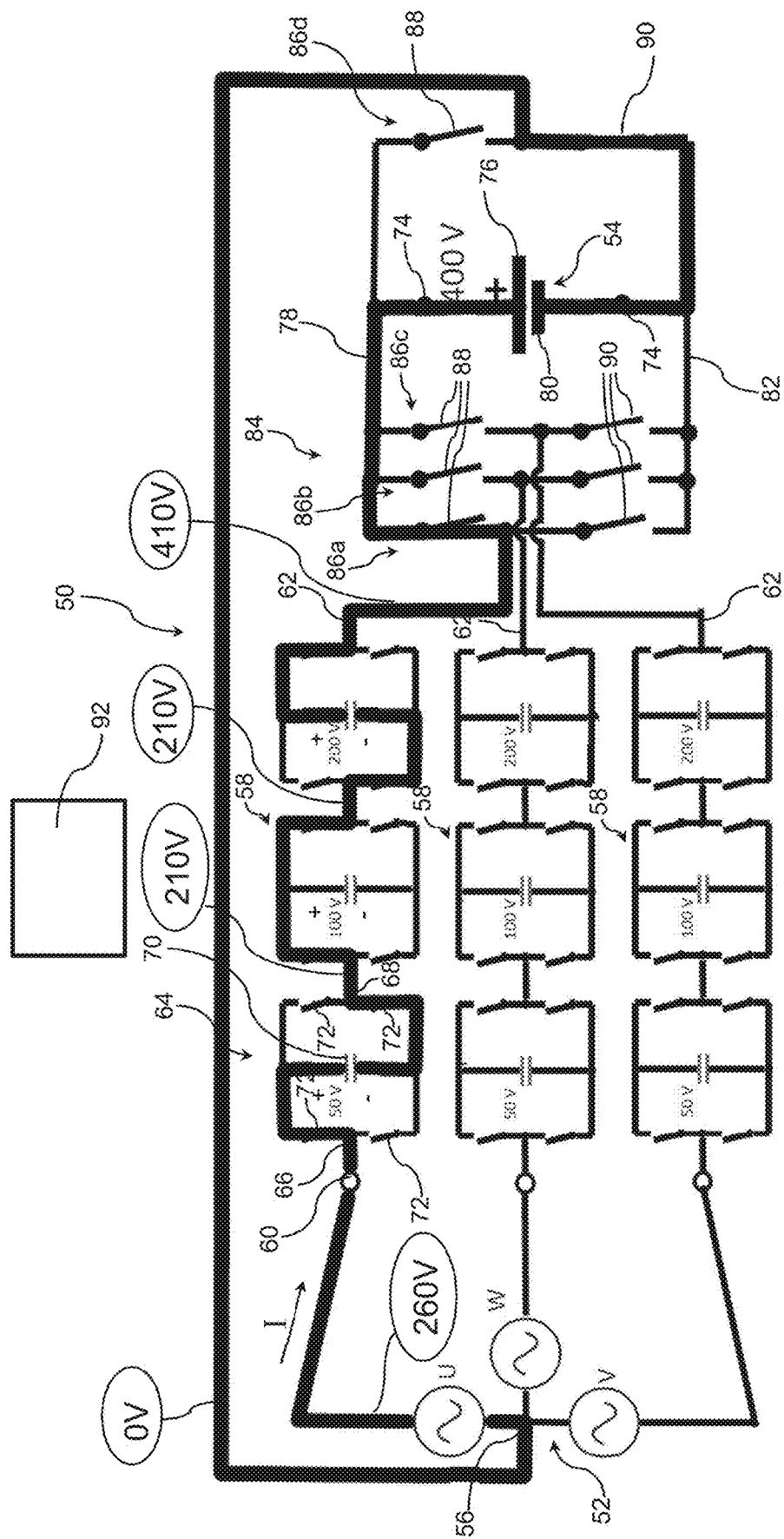
FIG. 7*b* shows the multilevel converter of FIG. 7, in which another specific configuration of module switching states is shown for one converter arm, different from the configuration of FIG. 7*a* but producing the same voltage across the converter arm as the configuration of FIG. 7*a*.

For example, assume that the battery 54 is to be charged, and at a given point in time, the phase voltage U is 260 V, as is shown in FIGS. 7a and 7b. Then, if the switching arrangement 84 is controlled to establish the positive state, in which the high-side switch 88 of the corresponding half-bridge branch 86a is closed, the low-side switch 90 of the corresponding half-bridge branch 86a is opened, and the star point 56 is connected with the negative conduction line 82, a "desired voltage" for the converter arm 58 would be 150 V, which together with the 260 V of the phase voltage U would add up to 410 V applied across the battery 54, which would be suitable for charging the latter. Importantly, there are different ways to establish the converter arm voltage of 150 V.

One way, which is shown in FIG. 7a, would be to connect the 50 V and 100 V modules in series with "ordinary polarity" (which actually corresponds to the "anti-series" connection with respect to the battery 54) and bypass the 200 V module. Note that in FIG. 7a, instead of showing the respective switches in the closed state, the conductive current path is indicated by a thick line, for clarity. In this case, the 50 V module and 100 V module would be discharged. Note that the term "50 V module" is a short form of the more precise term "module including the 50 V capacitor", and "bypassing" or "connecting a module" will be used as a short form of "bypassing/connecting the capacitor included in a module". Further in FIG. 7a, the direction of current flow is indicated by an arrow, and the voltage at different points within the circuit are indicated in oval frames, for illustration purposes. Note that the voltages shown do not reflect the voltage drop due to the ohmic resistance encountered by the current flow. Accordingly, the fact that +410 V and −400 V due not add up to 0, what could at first sight appear like a violation of the mesh rule, is due to the fact that a voltage drop of 10 V due to the ohmic resistance is assumed. It is further emphasized FIG. 7a only represents an illustrative example, and that in realistic embodiments, the ohmic resistances, and the associated voltage drops, would typically be very small.

Another way to establish a desired voltage of 150 V between the first and second ends 60, 62 of the converter arm 58 would be to bypass the 100 V module and to connect the 200 V module with "ordinary" polarity (in anti-series with the battery 54) and the 50 V module with opposite polarity (i.e. in anti-series with the 200V module but in series with the battery 54). This is shown in FIG. 7b. In this configuration, the 50 V module would be charged together with the 400 V battery 54, while the 200 V module would be discharged.

Figure 7C:
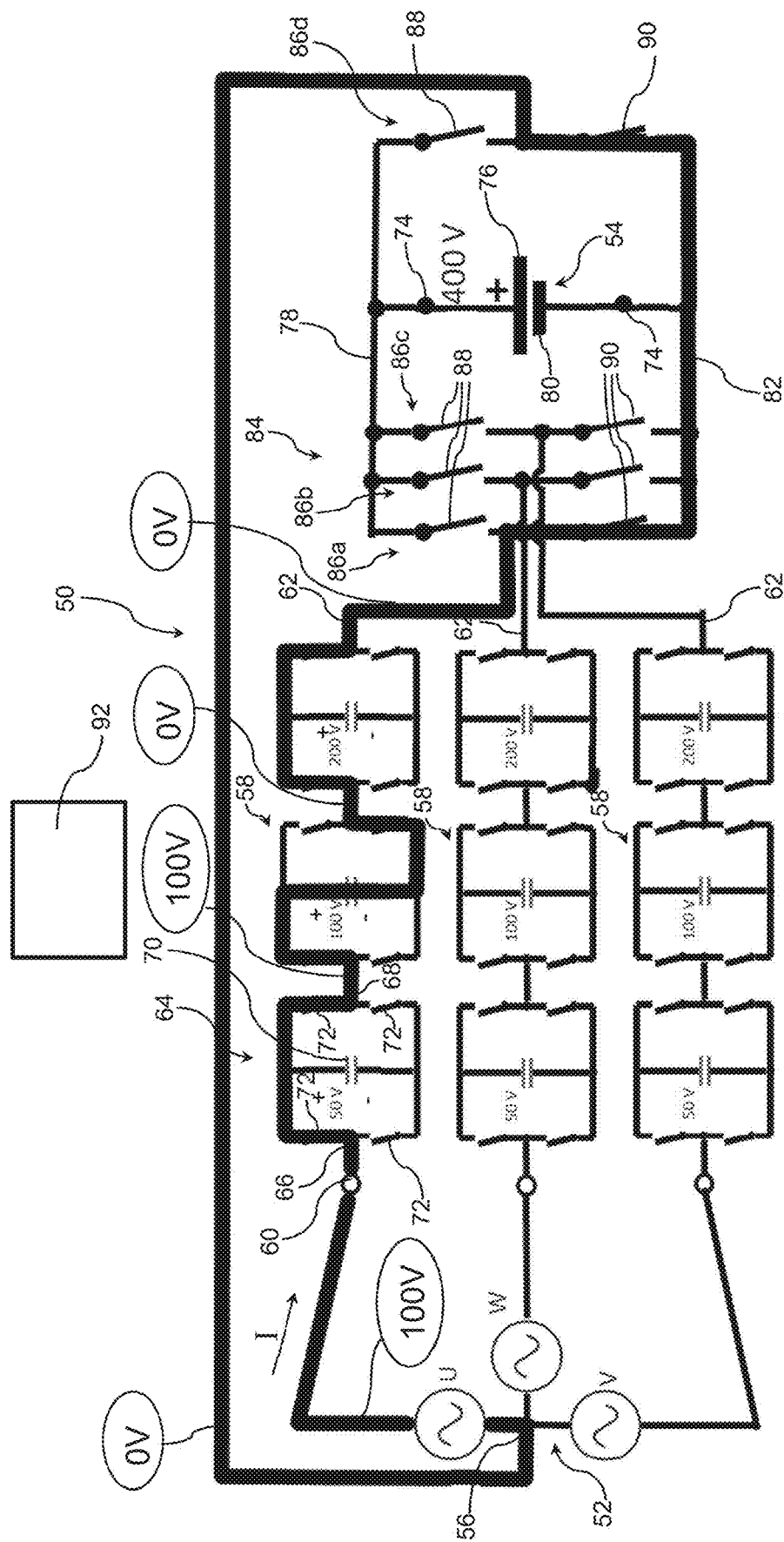
FIG. 7*c* shows the multilevel converter of FIG. 7, showing a configuration of module switching states and a switching state of the switching arrangement in which the battery is bypassed.

Moreover, it is not necessary that in each case, the 400 V battery 54 is connected with the converter arm 58. For example, consider a case where the phase voltage U is +100 V, and the switching arrangement 84 is in the positive state. In this case, it would it be possible connect the 100 V module and the 200 V module in series to—together with the phase voltage of +100 V—add up to 400 V, which could be used for charging the 400 V battery 54. However, in the same situation, as shown in FIG. 7c, it would also be possible to deactivate the 50 V and 200 V modules, to connect the 100 V module with reverse polarity, such that the phase voltage U (+100 V) and the voltage of the converter arm (−100 V) add up to 0 V with respect to the star point 56, and to connect the second end 62 of the corresponding converter arm 58 with the negative conduction line 82—by closing the low-side switch 90 and opening the high-side switch 88 of the half-bridge branch 86a—and eventually with the star point 52. This way, the 100 V module would be charged by the phase voltage U while the battery 54 is bypassed with respect to the upper converter arm 58. Note that for the positive connection state, it is sufficient if the positive conduction line 78 is connected with the second end of at least one converter arm (such as the converter arm associated with phase voltage V in the given example) to which a positive phase voltage is currently applied.

Moreover, when stating above that the positive and negative states of the switching arrangement are acquired alternatingly, this does not exclude further states to be used in between, such as a state where (similar to the positive state) the negative conduction line 82 is connected with the star point 56, but no converter arm 58 to which a positive phase voltage is applied is connected with the positive conductive line 78, or a state in which (similar to the negative state) the positive conduction line is connected with the star point 56, but no converter arm 58 to which a negative voltage is applied, is connected with the negative conduction line 82. This amounts to states, in which the battery 54 is bypassed completely. This could be expedient e.g. in cases where all or at least a large number of modules need to be charged.

By alternatingly switching between the positive and negative states, accompanied by the associated control of the individual modules 64, the 400 V battery can be continuously charged by the 400 V three-phase AC current source 52, while keeping the charging states of the module capacitors 70 close to the nominal values of 50 V, 100 V and 200 V, respectively.

Figure 11:
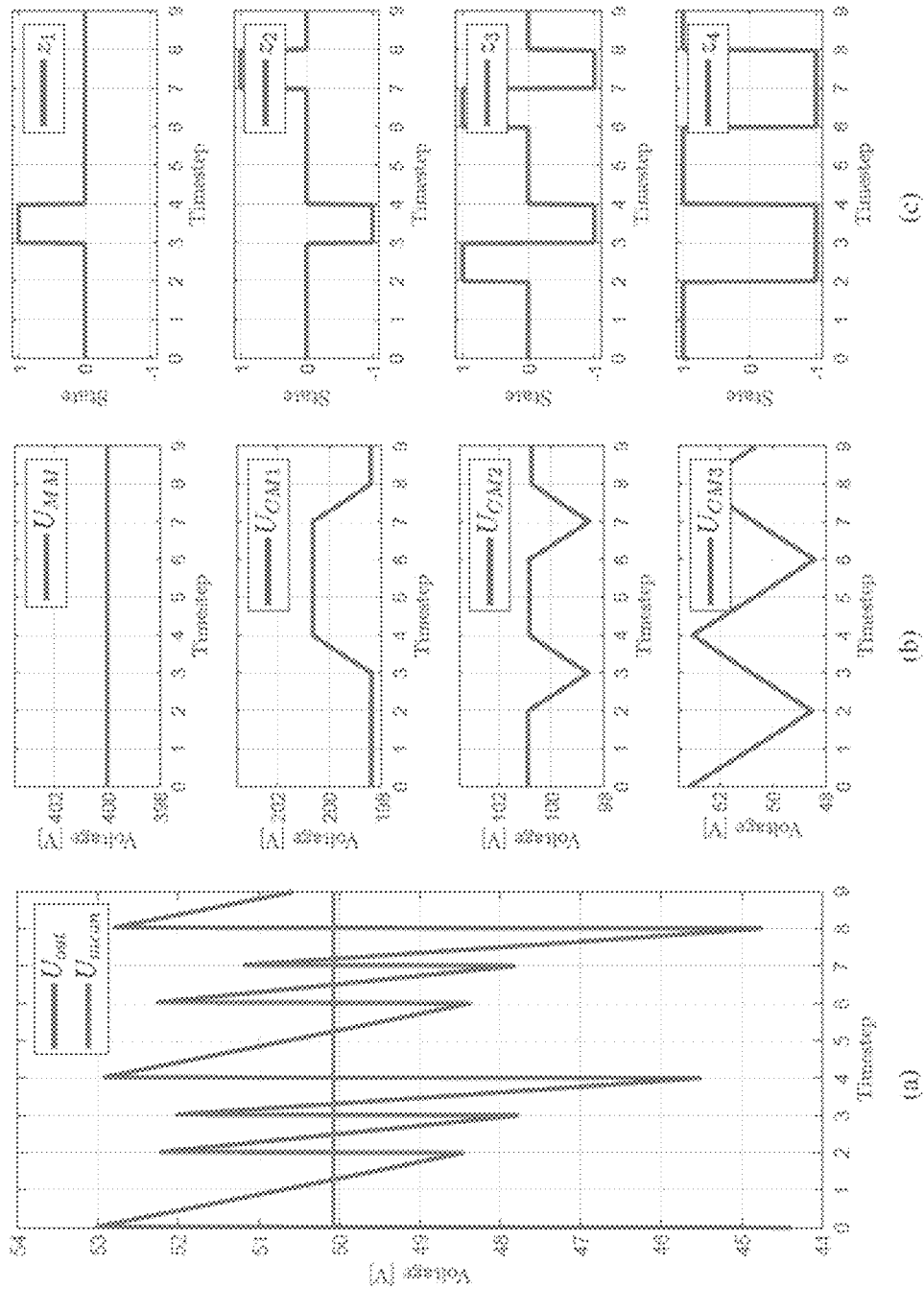
FIG. 11 shows a time-dependent output waveform obtained with the switching states of FIG. 10, as well as the voltages of the individual modules and the timing of the switching.

With reference to FIGS. 10 and 11, the principle of charge balancing of the capacitors 70 is described in more detail. For explaining the general principle, reference is made again to the converter arm 22 as shown in FIG. 1, which includes four modules 12, rather than three modules 64 as in the embodiment shown in FIG. 7. Let it be assumed that a voltage of 50 V is currently applied between the first and second ends 24, 26 of the converter arm 22, and that a load current of 5 A flows through the converter arm 22. FIG. 10 shows a table summarizing the four possible switching states of the modules 12 that are compatible with this situation. The variable $z_i=+i$ indicates that a module 12 is connected such as to be discharged, meaning that the current flow is in the same direction as the voltage of the capacitor 18 of the module 12, $z_i=-1$ indicates that a module 12 is connected such as to be discharged, meaning that the current flow is in the opposite direction as the voltage of the capacitor 18 of the module 12, and zi=0 means that the module 12 is bypassed. i=1, 2, 3 and 4 denotes the 400 V, 200 V, 100 V, and 50 V modules 12, respectively.

By rapidly switching between these four possible switching states, the modules can be charged and discharged as needed, while continuously providing the desired total output voltage of 50 V.

FIG. 11(*a*) shows the output voltage as a function of time and the average output voltage for nine time steps, wherein each time step has a duration of 20 μs only. It is seen that the average voltage is at exactly 50 V, while the time-dependent output voltage may fluctuate between 45 and 53 V. FIG. 11(*b*) shows the time-dependent voltages of the individual capacitors 18 of the modules 12, where $U_{MM}$ is the voltage of the "main module" (i.e. the 400 V module), and $U_{CM1}$ to $U_{CM3}$ denote the voltages of the 200 V, 100 V and 50 V modules, respectively, and FIG. 11(*c*) shows the switching states of the individual modules 12 that lead to this voltage. It is seen that by selecting the switching states, indeed the voltages of the individual modules can be "balanced", i.e. kept close to their nominal values. Note that the voltage of the main module is constantly at 400 V, because it is permanently connected to the 400 V source. As such, it takes the role of the battery 54 in the embodiment of FIG. 7, where the same type of balancing can be carried out, to keep the capacitors 70 of the module 64 at the nominal values.

It is further seen that the switching between the states for the purpose of capacitor balancing should be executed at a rate that is several times higher than the voltage modulation frequency, as a plurality of different switching states of the modules 64 are established for the same output voltage of the converter arm 22. The switching states are established by the control system 92. The control system 92 has to ensure that the output voltage of the converter arm 22 or 58 provides the desired output voltage, while maintaining/balancing the nominal voltages of the module capacitors 18/70. In one embodiment, the control system 92 attempts to minimize the voltage differences between the actual module voltages and the nominal voltages by selecting an optimal switching combination according to a suitable weighting vector.

In order to select the most suitable combination of module switching states, in one embodiment the control system 92 calculates a voltage error vector, having the difference between $U_{CMimeas}$ measured voltage and nominal or "reference" voltage $U_{CMiref}$ as its components:

$$\Delta \vec{U}_{CMn} = \begin{pmatrix} u_{MM_{meas}} \\ u_{CM1_{meas}} \\ \vdots \\ u_{CM(n-1)_{meas}} \end{pmatrix} - \begin{pmatrix} u_{MM_{ref}} \\ u_{CM1_{ref}} \\ \vdots \\ u_{CM(n-1)_{ref}} \end{pmatrix} \quad (4)$$

With n being the number of modules per phase and in beeing the number of switching combinations for the i-th voltage level, all possible switching combinations can be represented in a matrix $M_i$ as $$M_i = \begin{pmatrix} z_{11} & \cdots & z_{n1} \\ \vdots & \ddots & \vdots \\ z_{1m} & \cdots & z_{nm} \end{pmatrix} \quad (5)$$

Consequently, the weighting vector $\tilde{g}_i$ can be calculated as $$\tilde{g}_i = M_i \cdot \Delta \vec{U}_{CMn}$$

Thus, the effect of each switching combination on the global voltage error can be assessed. The switching combination achieving the best balancing effect is chosen from all switching combinations as $$(\max)(\tilde{g}_i) \to z_{opt}$$

For example, if the desired output voltage of the converter arm is set to $U_{out}$=50 V, i.e. i=1, and all modules except for the main module show a voltage difference of about +1V relative to their nominal values, the weighting vector becomes $$\tilde{g}_1 = M_1 \cdot \vec{U}_{CMn} = \begin{pmatrix} 0 & 0 & 0 & 1 \\ 0 & 0 & 1 & -1 \\ 0 & 1 & -1 & -1 \\ 1 & -1 & -1 & -1 \end{pmatrix} \cdot \begin{pmatrix} 0 \\ 1 \\ 1 \\ 1 \end{pmatrix} = \begin{pmatrix} 1 \\ 0 \\ -1 \\ -3 \end{pmatrix} \quad (8)$$

Note that the matrix $M_1$ corresponds to the table shown in FIG. 10. From this weighting vector, the combination showing the best effect on the unbalance is chosen:

$$g_{50V} = \max(g_{50V}) = 1 \to z_{opt} = (0\ 0\ 0\ 1) \quad (9)$$

Namely, the largest vector component of the weighting vector is its first component, corresponding to the "first switching state", with in this case a value of "1". The combination associated with this switching state is the state in which the 50 V module is discharged, and all other modules are bypassed. Since all module capacitors have a surplus of charge, it is indeed appropriate that a switching state is chosen in which just one of them is discharged and none is charged. In all other switching states, at least one capacitor would be further charged, which is not desired at this point in time. Clearly, the least appropriate state would be the fourth state, in which the capacitors of each of the 50 V module, the 100 V module and 200 V module would each be further charged. This least appropriate switching state is obviously suppressed by the lowest weighting vector component of −3.

Figure 12:
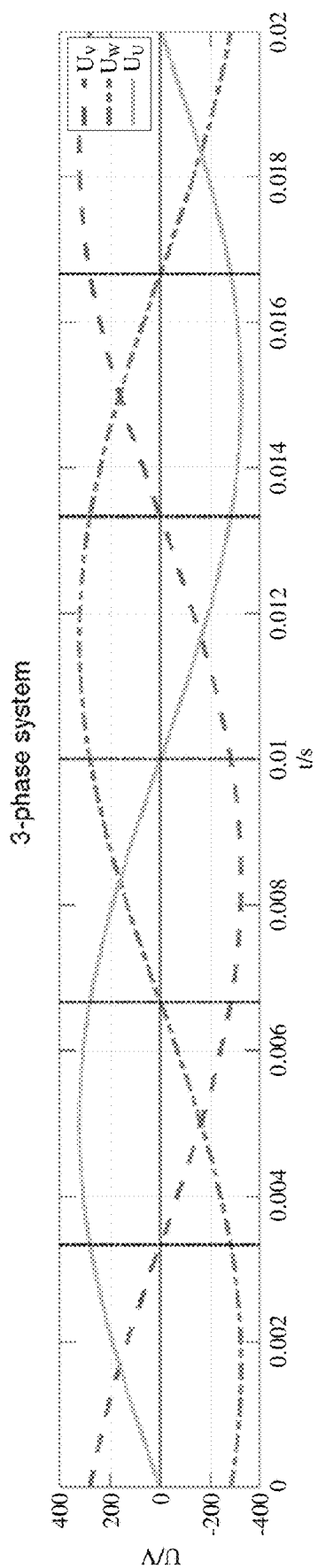
FIG. 12 shows the voltage waveforms of the three phases of a mains network for one period.

FIG. 12 shows a full period of the voltages $U_V$, $U_W$ and $U_U$ associated with the phases U, V and W as provided by a mains network. Each of the voltages $U_V$, $U_W$ and $U_U$ has an amplitude of 325.3 V, a frequency of 50 Hz and an offset of ±120° with respect to the other two voltages. As is seen from FIG. 12, at each instant in time, there are at least two voltages among the voltages $U_V$, $U_W$ and $U_U$ having opposite sign. Moreover, the sum of all three voltages at each instant in time is zero.

Figure 13:
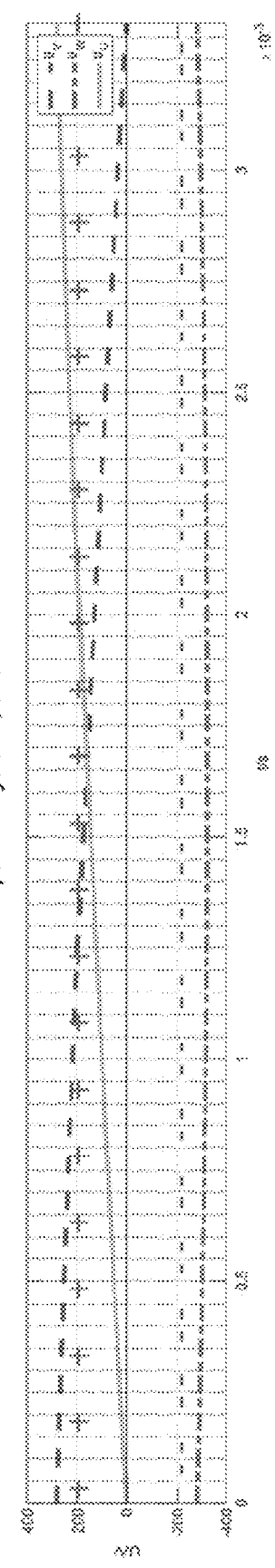
FIG. 13 shows the first ⅙ of the waveform of FIG. 12 separated into time slots.

FIG. 13 shows an enlarged representation of the first ⅙ of the full period of FIG. 12, during which $U_U$ and $U_V$ are positive and $U_W$ is negative. Moreover, this first ⅙ of the full period is further divided into a plurality of time intervals of uniform length. The frequency of these intervals, i.e the inverse period, is at 20 kHz. In FIG. 13, for each of the timeslots, the state of the switching arrangement 84 is indicated, where the "+" indicates the positive state and the "−" indicates the negative state. In the embodiment shown, in this first ⅙ of the period, where to phase voltages are positive and only one phase voltage is negative, for each positive state timeslot, two timeslots are dedicated to the negative state. However, this is not mandatory, and there are many different ways to assign the timeslots to the positive and negative states of the switching arrangement 84. In some embodiments, the number of timeslots is equal, and in yet other embodiments, the distribution of timeslots is more closely adapted to the waveform of the phase voltages. During each of the timeslots, the modules 64 are switched, under control of the control system 92, to states such that the desired output voltage is established across the respective converter arm 58, and among the available switching possibilities to establish this output voltage, the ones are selected that best balance the voltages of the module capacitors 70, in a way explained above with reference to FIGS. 10 and 11.

Figure 14:
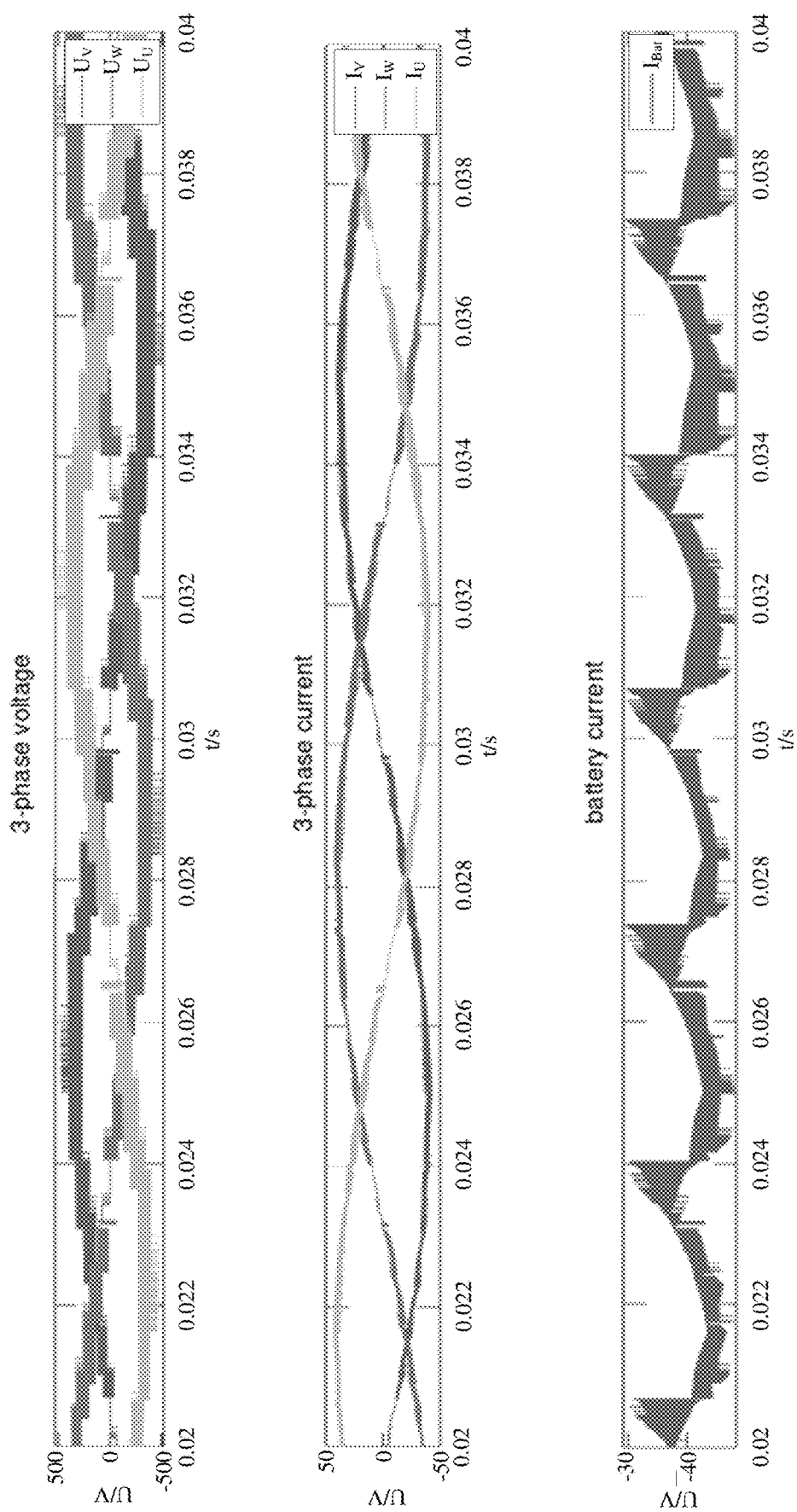
FIG. 14 shows a phase voltage, phase current and battery charging current, respectively, obtained with the converter of FIG. 7 for the phase voltages of FIG. 13.

FIG. 14 shows the resulting phase voltage, phase current and battery charging current, respectively. More particularly, the upper diagram in FIG. 14 shows the voltage between the first end 60 of each converter arm 58 (location "A" in FIG. 7) and the midpoint of the fourth half bridge 86d (location "B" in FIG. 7). From the battery charging current, it can be seen that a constant charging through all three phases is enabled.

Figure 15:
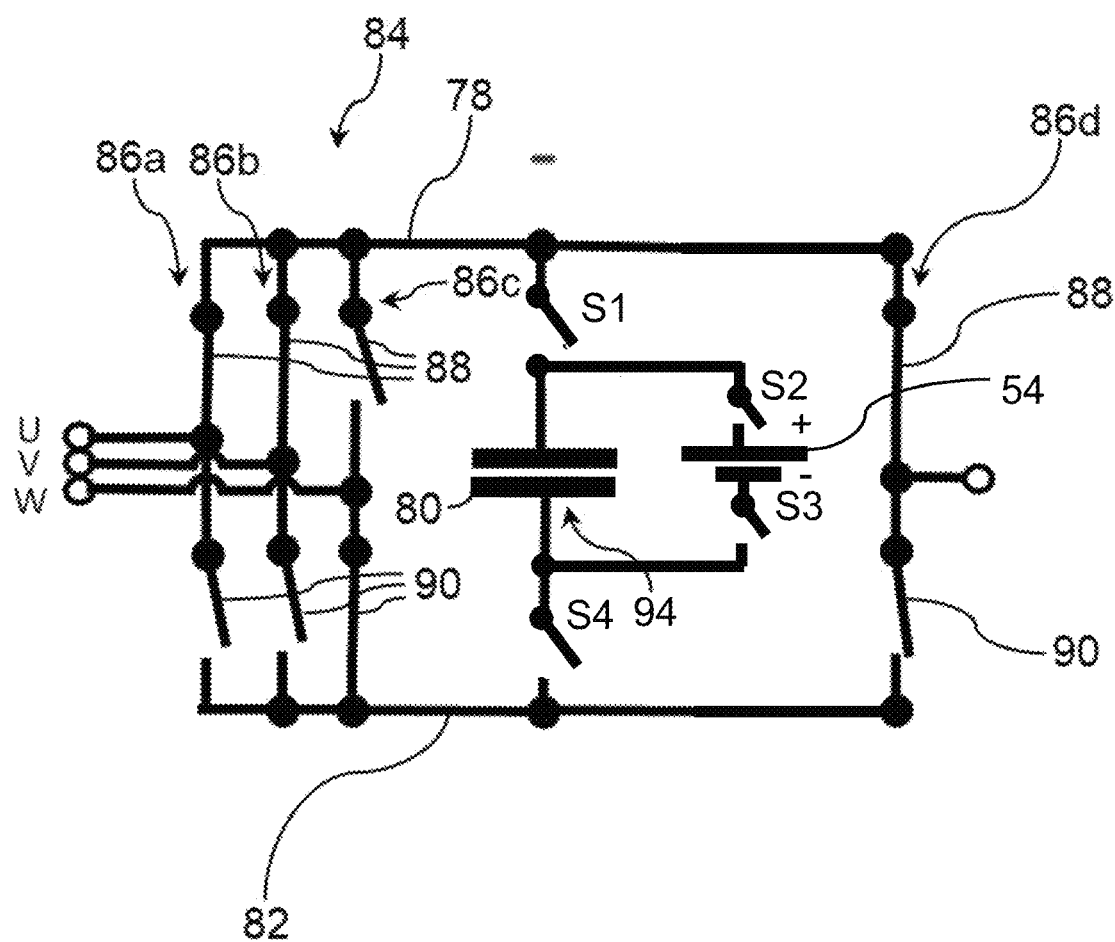
FIG. 15 shows an alternative switching arrangement.

FIG. 15 shows a modification of the switching arrangement 84, showing how the battery 54 and the voltage source 52 (not shown in FIG. 15) can be galvanically separated. For this purpose, an additional capacitor 94 and additional switches S1 to S4 are provided. In a first state, switches S1 and S4 are closed, while switches S2 and S3 are open. In this state, the capacitor 94 can exchange charge with the further modules 64 of the converter arms 58 and the voltage source 52, without being connected to the battery 54. In a second state, the switches S1 and S4 are opened and the switches S2 and S3 are closed, such that charge can be transferred from the capacitor 94 to the battery 54, while the battery 54 remains decoupled from the voltage source 52.

In the foregoing specification, embodiments of the invention have been described with reference to specific exemplary embodiments thereof. It should be understood that various modifications may be made thereto without departing from the spirit and scope of the invention as set forth in the following claims. The specification and drawings are, accordingly, to be regarded in an illustrative sense rather than a restrictive sense.

LIST OF REFERENCE SIGNS 10 exponential modular multilevel converter (EMMC)
11 module
14 first terminal of module 12
16 second terminal of module 12
18 capacitor
20 module switch
22 converter arm
24 first end of converter arm 22
26 second end of converter arm 22
28 DC voltage source
30 positive terminal
32 positive conduction line
34 negative terminal
36 negative conduction line
38 switching arrangement
40 half-bridge branch
42 high-side switch
44 low-side switch
50 multilevel converter
52 power source
54 battery
56 star point
58 converter arm
60 first end of converter arm 58
62 second end of converter arm 58
64 module
66 first terminal
68 second terminal
70 capacitor
72 module switch
74 battery connection interface
76 positive terminal of battery 54
78 positive conduction line
80 negative terminal of battery 54
82 negative conduction line
84 switching arrangement
86a-d half-bridge branches
88 high-side switch
90 low-side switch
92 control system
94 capacitor
S1-S4 switches

The invention claimed is:

1. A multilevel converter for voltage conversion between a three-phase AC voltage and a DC voltage, comprising:

three converter arms, each having a first end for connecting to a corresponding phase of a three-phase AC voltage source and a second end, wherein each converter arm comprises a plurality of sequentially interconnected modules, wherein each module comprises:

at least one first terminal and at least one second terminal, an energy storage element for storing electrical energy and a plurality of module switches, wherein in each two adjacent modules, the at least one first terminal of one module is connected either directly or via an intermediate component to the at least one second terminal of the other module, wherein said plurality of module switches of the modules allow for selectively deactivating the energy storage element of each module, for connecting energy storage elements of adjacent modules in series, and for connecting energy storage elements of at least some adjacent modules in anti-series, a main energy store, or interfaces for connecting the main energy store, said main energy store having a positive terminal connected or connectable to a positive conduction line and a negative terminal connected or connectable to a negative conduction line of said multilevel converter, a switching arrangement for selectively connecting said positive and negative conduction lines with selected second ends of said converter arms, and a control system for controlling said switching arrangement based on current phase voltages of said three-phase AC voltage source, wherein said switching arrangement is configured to establish, under the control of said control system, a positive state, in which the negative conduction line is connected with a star point of said three-phase AC voltage source and the positive conduction line is connected with the second end of one or two converter arms to which a positive phase voltage is currently applied, and a negative state, in which the positive conduction line is connected with said star point of said three-phase AC voltage source, and the negative conduction line is connected with the second end of one or two converter arms to which a negative phase voltage is currently applied, wherein said positive and negative states are established alternatingly, but not simultaneously.

2. The multilevel converter of claim 1, wherein in said positive state, the second end of each converter arm to which currently a negative voltage is supplied is disconnected at least from the positive conduction line, and wherein in said negative state, the second end of each converter arm to which currently a positive voltage is supplied is disconnected at least from the negative conduction line.

3. The multilevel converter of claim 1, wherein said switching arrangement comprises three half-bridge branches, each connected between said positive and negative conduction lines and comprising a series connection of a high-side switch which is closer to said positive conduction line and a low-side switch which is closer to said negative conduction line, wherein the second end of each converter arm is connected with an intermediate point between the high-and low-side switches in a corresponding one of the half-bridge branches.

4. The multilevel converter of claim 3, wherein in establishing said positive state, the control system is configured to close the high-side switch and to open the low-side switch in at least one half-bridge branch connected with a converter arm to which a positive phase voltage is currently applied, and to open at least the high-side switch in each half-bridge branch connected with a converter arm to which a negative phase voltage is currently applied, and wherein in establishing said negative state, the control system is configured to close the low-side switch and to open the high-side switch in at least one half-bridge branch connected with a converter arm to which a negative phase voltage is currently applied, and to open at least the low-side switch in each half-bridge branch connected with a converter arm to which a positive phase voltage is currently applied.

5. The multilevel converter of claim 1, wherein said switching arrangement comprises a fourth half-bridge branch connected between said positive and negative conduction lines and comprising a series connection of a high-side switch which is closer to said positive conduction line and a low-side switch which closer to said negative conduction line, wherein an intermediate point between the high-and low-side switches in the fourth half-bridge branch is connected with said star point of said three-phase AC voltage source, and wherein said control system is configured to control said high-side and low-side switches of the fourth half-bridge branch to be open and closed, respectively, in the positive state, and to be closed and open, respectively, in the negative state.

6. The multilevel converter of claim 1, wherein said three-phase AC voltage source provides three sinusoidal voltage phases having an identical amplitude Up, or amplitudes that differ at most by ±10% from each other, and a mutual phase shift of 120°+10%.

7. The multilevel converter of claim 6, wherein said main energy store has a nominal voltage $U_0$, and wherein the following relationship applies:

$U_P = a \cdot U_0$, wherein $a \leq 0.85$.

8. The multilevel converter of claim 7, wherein said main energy store has a nominal voltage $U_0$, and wherein $U_0 = 400$ V±10% and $U_P = 325.3$ V±10%.

9. The multilevel converter of claim 1, wherein said main energy store is a battery of an electric vehicle, and the multilevel converter serves as a charging converter for charging said battery using three-phase electric power.

10. The multilevel converter of claim 1, wherein the main energy store has a nominal voltage $U_0$, wherein said multilevel converter comprises $1^{st}$ to M-th modules, and wherein the energy storage elements of the n-th module among said modules has a nominal voltage $U_0/2^n$, with n=1 .... M.

11. The multilevel converter of claim 10, wherein 2≤M≤6.

12. The multilevel converter of claim 10, wherein 3≤M≤5.

13. The multilevel converter of claim 1, wherein said control system is configured to balance the voltages of the energy storage elements of said modules, by determining a number of possible switching states of the individual modules that lead to a desired voltage between the first and second ends of a converter arm, and by selecting switching states among said possible switching states such that the voltages of the energy storage elements on average approach their nominal values.

14. The multilevel converter of claim 1, wherein the control system is configured to establish a plurality of different switching states among said possible switching states of the individual modules one after another while maintaining the voltage between the first and second ends of said converter arm.

15. The multilevel converter of claim 1, wherein said energy storage element is a capacitor.

16. The multilevel converter of claim 1, wherein said main energy store is a battery.

17. A method for converting a voltage between a three-phase AC voltage and a DC voltage using a multilevel converter, wherein said multilevel converter comprises three converter arms, each having a first end for connecting to a corresponding phase of a three-phase AC voltage source and a second end, wherein each converter arm comprises a plurality of sequentially interconnected modules, wherein each module comprises at least one first terminal and at least one second terminal, an energy storage element for storing electrical energy, and a plurality of module switches, wherein in each two adjacent modules, the at least one first terminal of one module is connected either directly or via an intermediate component to the at least one second terminal of the other module, a main energy store, or interfaces for connecting the main energy store, said main energy store having a positive terminal connected or connectable to a positive conduction line and a negative terminal connected or connectable to a negative conduction line of said converter, a switching arrangement for selectively connecting said positive and negative conduction lines with selected second ends of said converter arms, and a control system for controlling said switching arrangement based on current phase voltages of said three-phase AC voltage source, wherein said method comprises operating said plurality of module switches of the modules such as to one or more of selectively deactivate the energy storage element of a given module, connect energy storage elements of adjacent modules in series, and connect energy storage elements of adjacent modules in anti-series, to thereby establish a predetermined voltage between the first and second ends of said converter arms, wherein the method further comprises establishing alternatingly, but not simultaneously, a positive state, in which the negative conduction line is connected with a star point of said three-phase AC voltage source and the positive conduction line is connected with the second end of one or two converter arms to which a positive phase voltage is currently applied, and a negative state, in which the positive conduction line is connected with said star point of said three-phase AC voltage source, and the negative conduction line is connected with the second end of one or two converter arms to which a negative phase voltage is currently applied.

18. The method of claim 17, wherein in said positive state, the second end of each converter arm to which currently a negative voltage is supplied is disconnected at least from the positive conduction line, and wherein in said negative state, the second end of each converter arm to which currently a positive voltage is supplied is disconnected at least from the positive conduction line.

19. The method of claim 17, wherein said switching arrangement comprises three half-bridge branches, each connected between said positive and negative conduction lines and comprising a series connection of a high-side switch which is closer to said positive conduction line and a low-side switch which is closer to said negative conduction line, wherein the second end of each converter arm is connected with an intermediate point between the high-and low-side switches in a corresponding one of the half-bridge branches.

20. The method of claim 17, wherein said main energy store is a battery of an electric vehicle, and the multilevel converter serves as a charging converter for charging said battery using three-phase electric power.

21. The method of claim 17, wherein the main energy store has a nominal voltage $U_0$, wherein said multilevel converter comprises 1st to M-th modules, and wherein the energy storage elements of the n-th module among said modules has a nominal voltage $U_0/2^n$.

22. The method of claim 17, further comprising a step of balancing the voltages of the energy storage elements, by determining a number of possible switching states of the individual modules that lead to a desired voltage between the first and second ends of a converter arm, and by selecting switching states among said possible switching states such that the voltages of the energy storage elements on average approach their nominal values.

* * * * *